Aug. 23, 1960   J. H. GRUVER   2,950,341
PRINTING MACHINES
Filed March 10, 1958   14 Sheets-Sheet 1
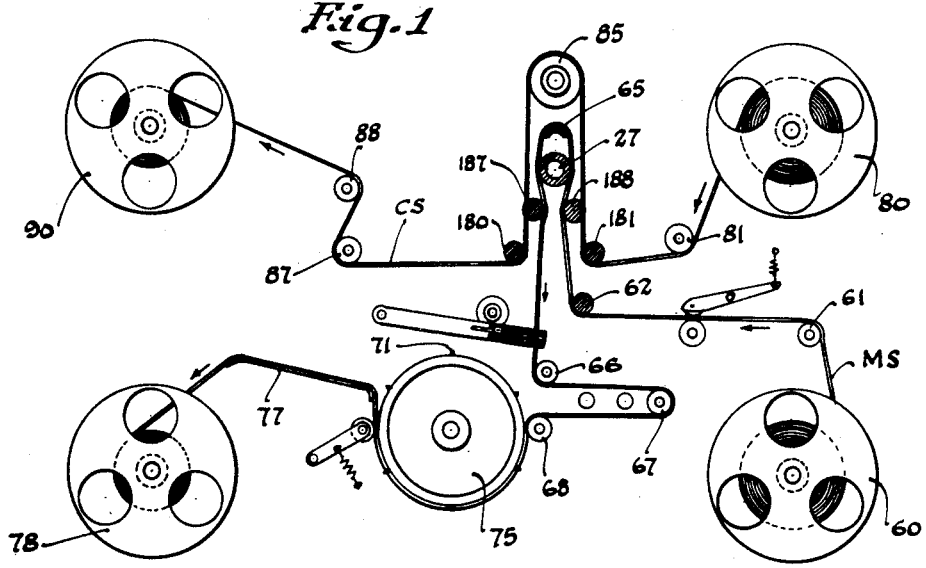
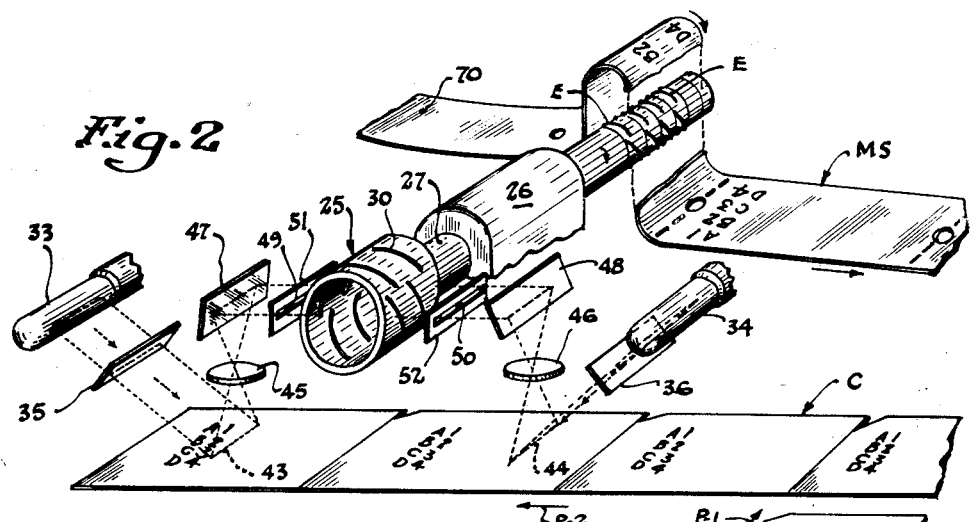
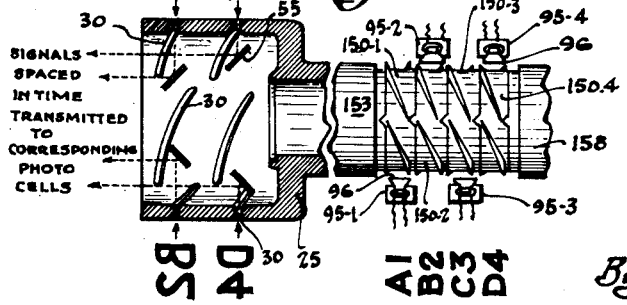
Inventor
John H. Gruver
By Wallace and Cannon
Attorneys Aug. 23, 1960   J. H. GRUVER   2,950,341
PRINTING MACHINES
Filed March 10, 1958   14 Sheets-Sheet 2
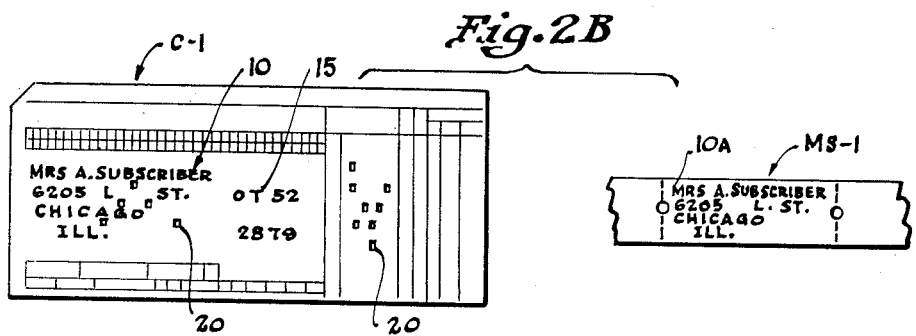
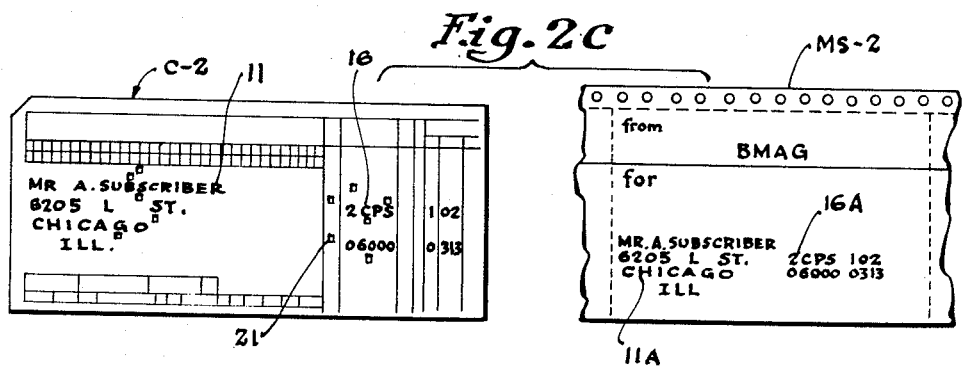
Inventor
John H. Gruver
By Wallace and Cannon
Attorneys

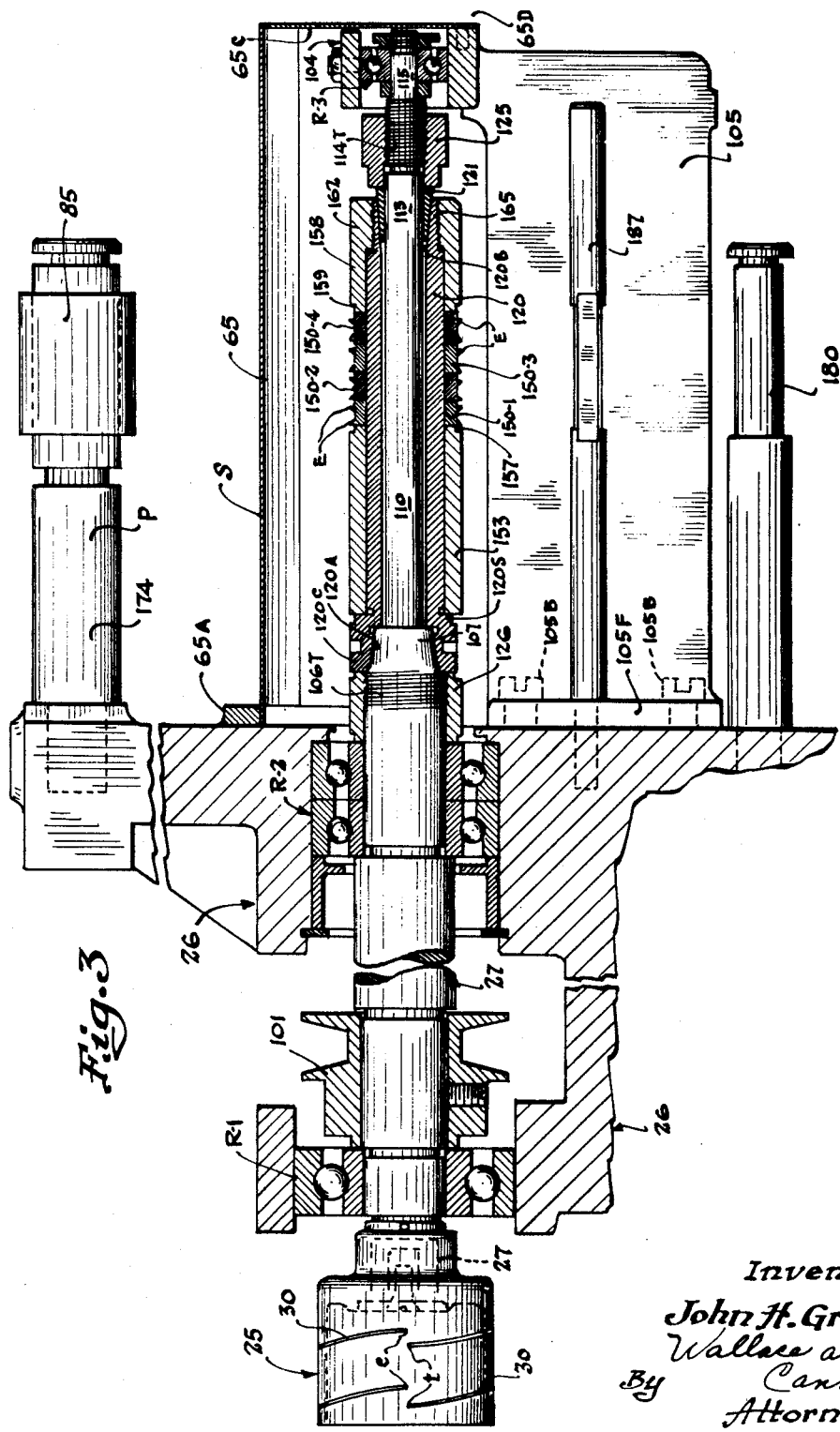

Aug. 23, 1960   J. H. GRUVER   2,950,341
PRINTING MACHINES
Filed March 10, 1958   14 Sheets-Sheet 4
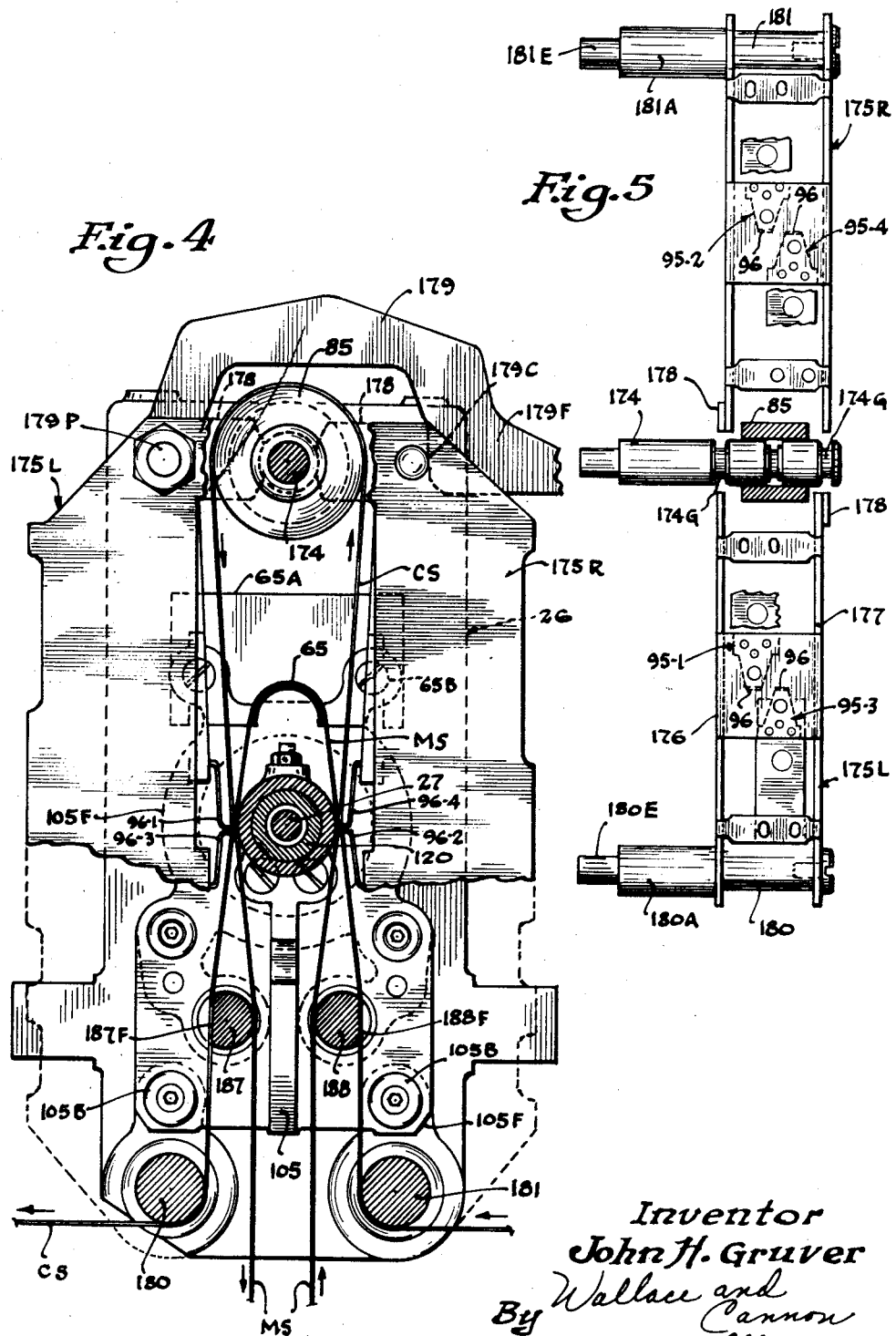
Inventor
John H. Gruver
By Wallace and Cannon
Attorneys

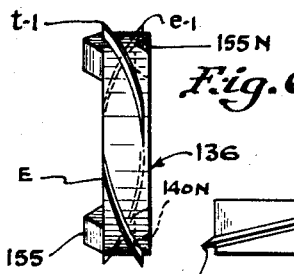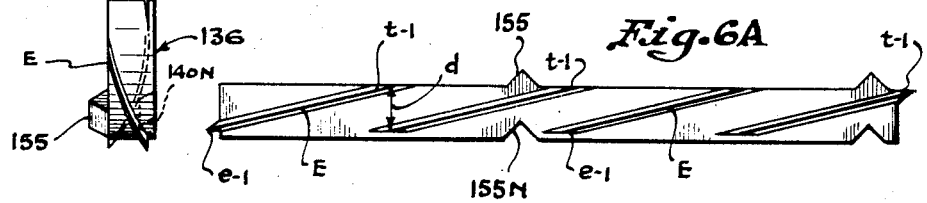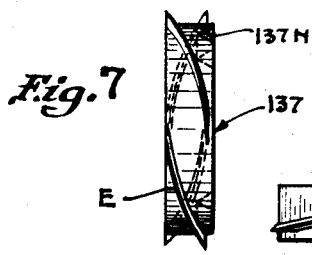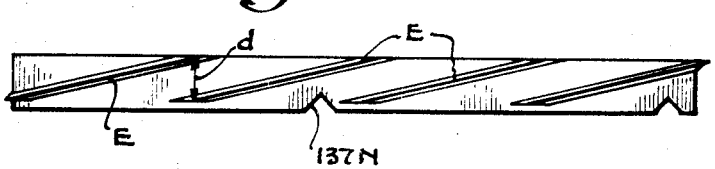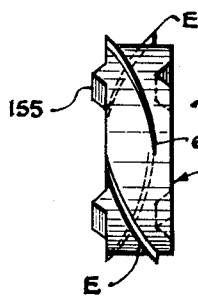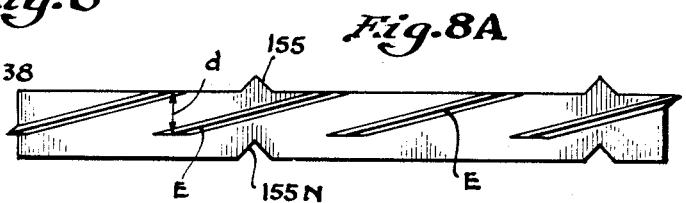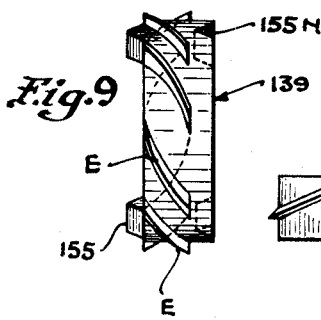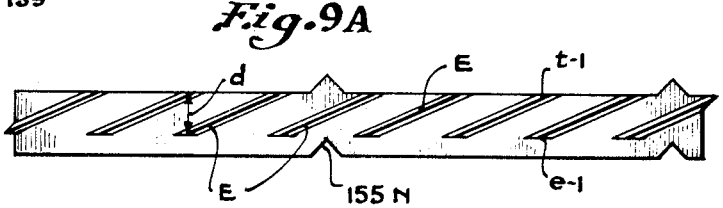

Aug. 23, 1960 J. H. GRUVER 2,950,341
PRINTING MACHINES
Filed March 10, 1958 14 Sheets-Sheet 7
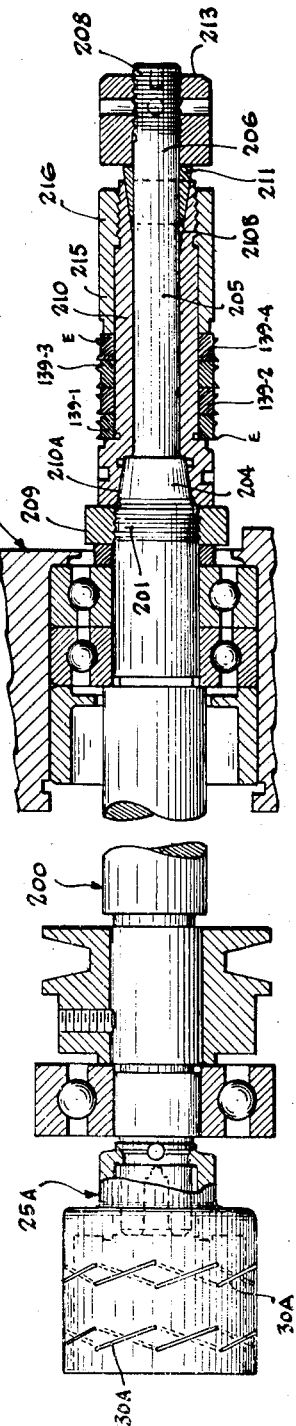
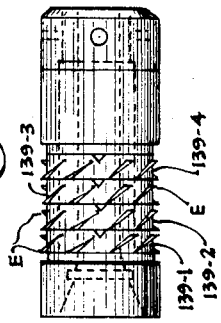
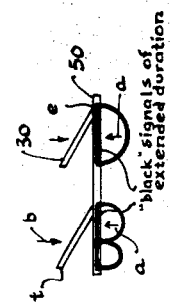
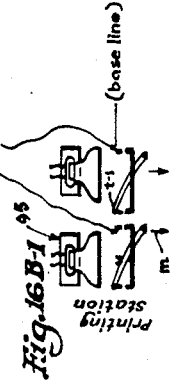
Inventor
John H. Gruver
By Wallace and Cannon
Attorneys Aug. 23, 1960  J. H. GRUVER  2,950,341
PRINTING MACHINES
Filed March 10, 1958  14 Sheets-Sheet 8

Inventor
John H. Gruver
By Wallace and Cannon
Attorneys

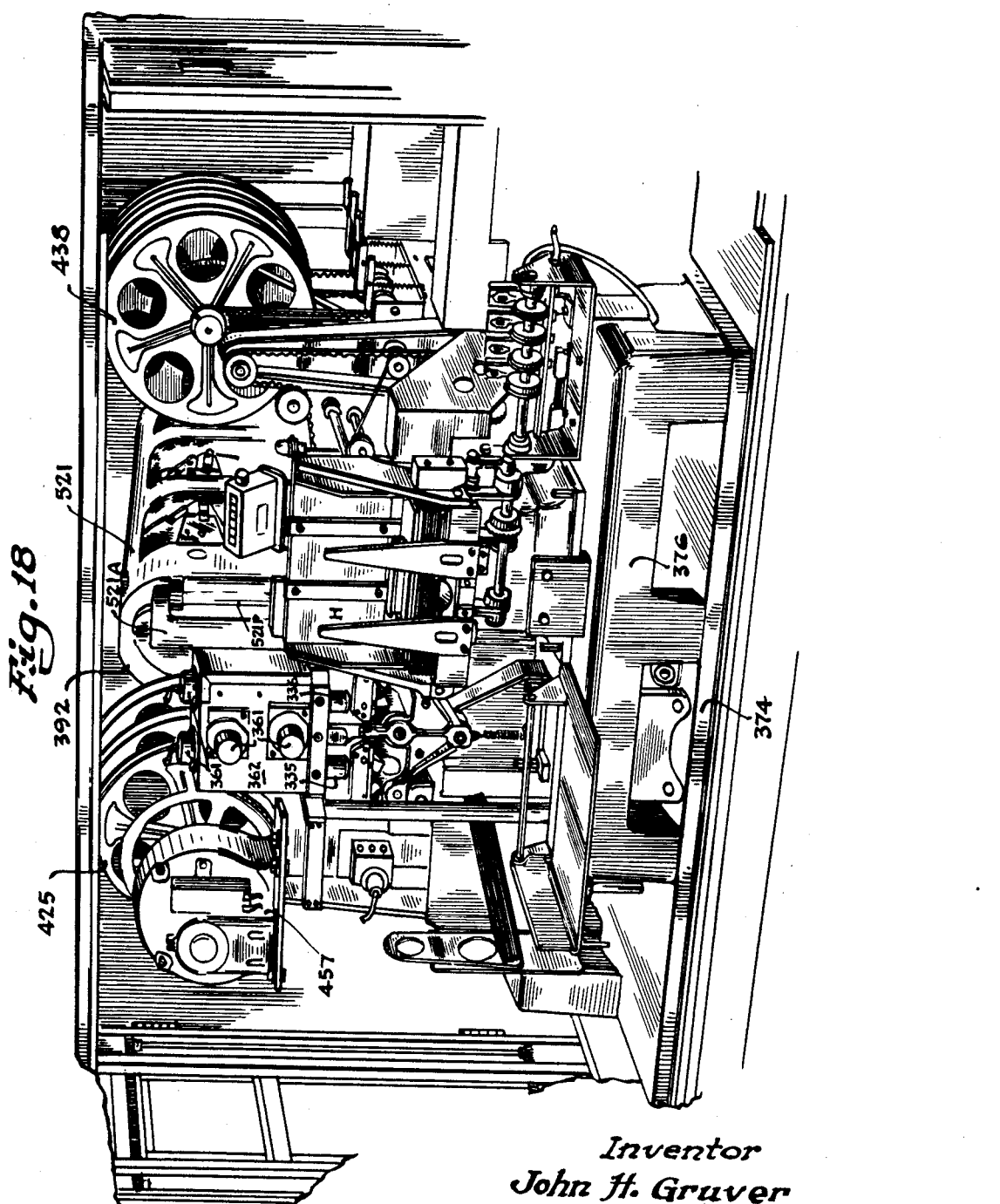

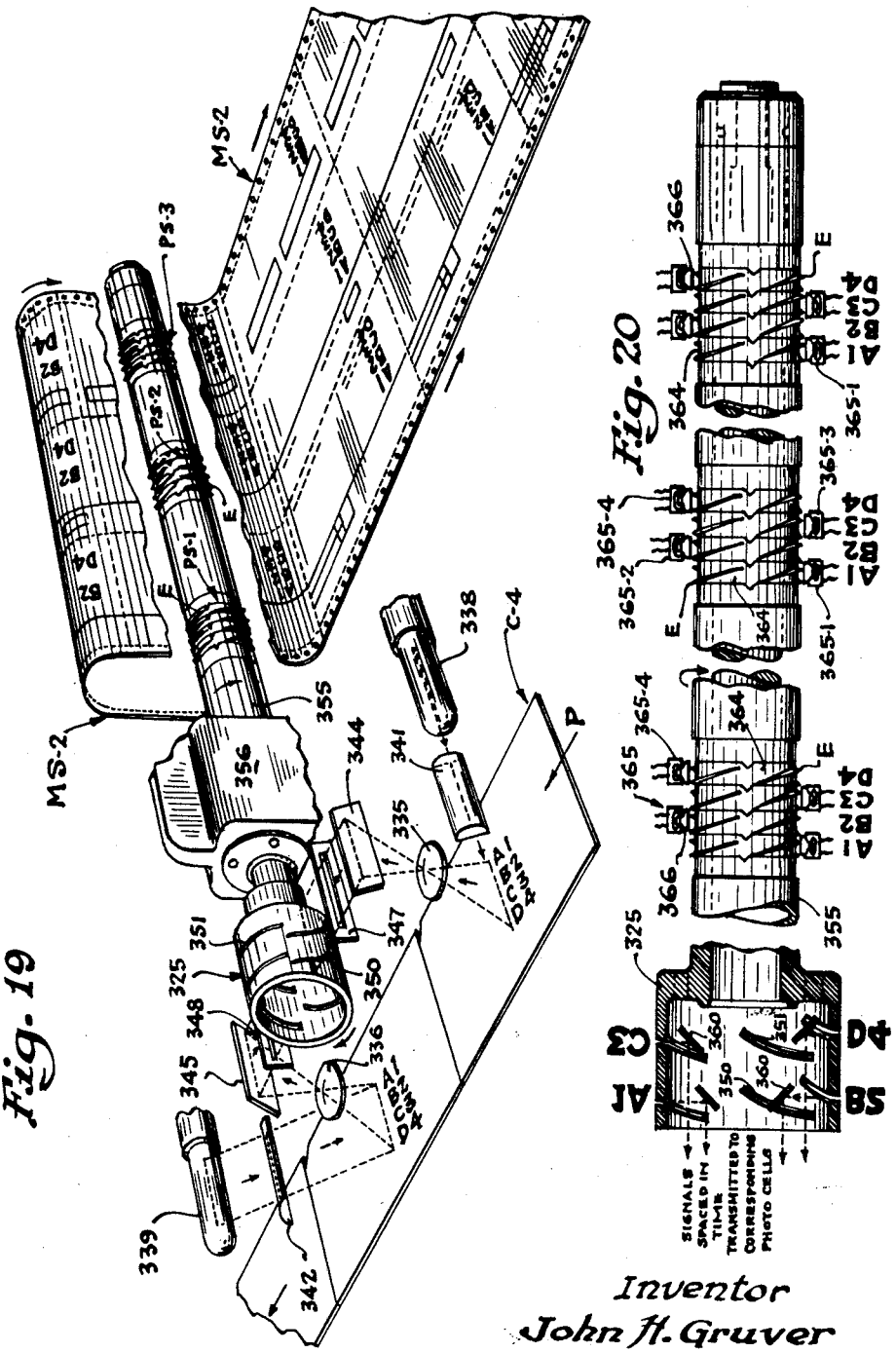

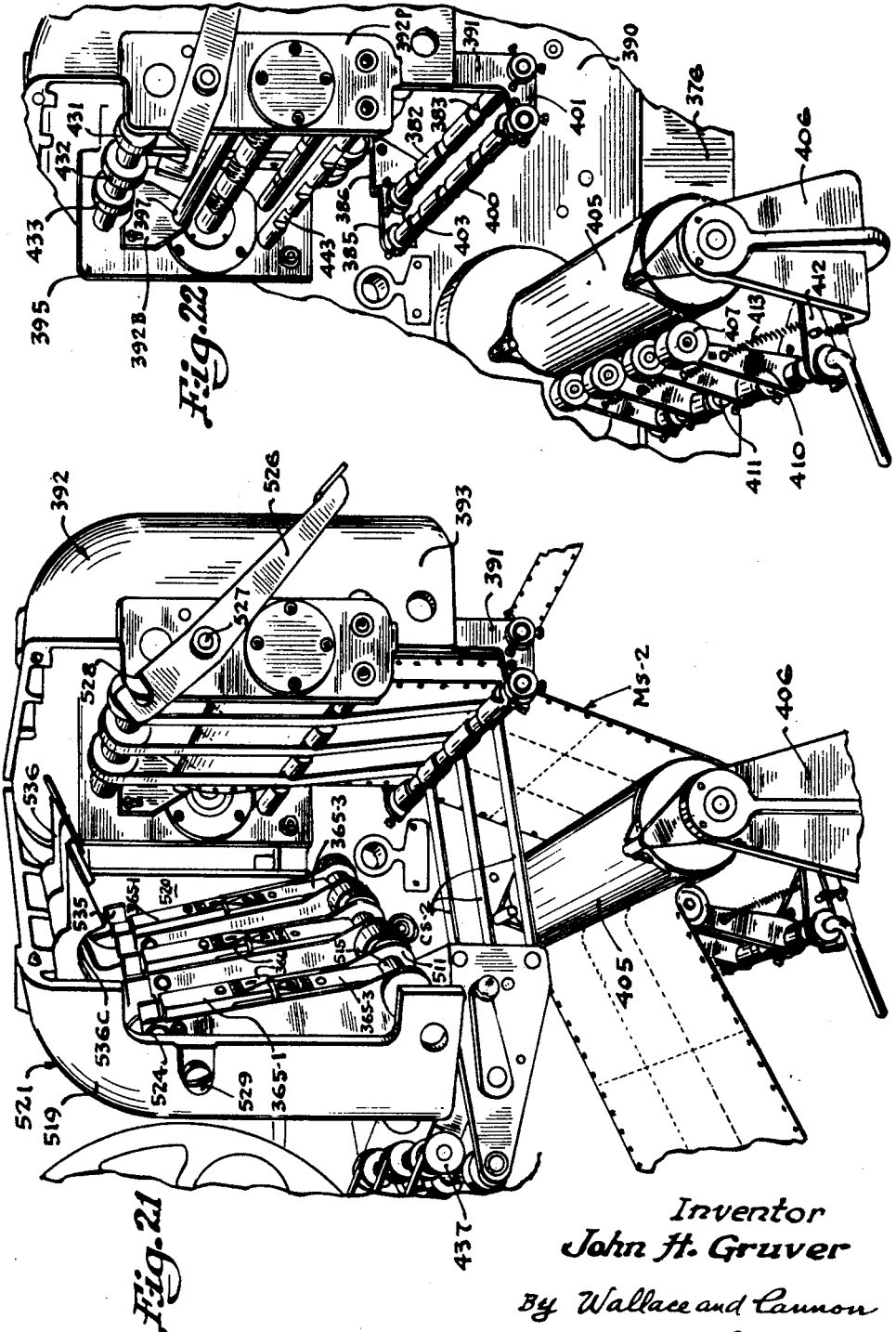

Inventor
John H. Gruver
By Wallace and Cannon
Attorneys

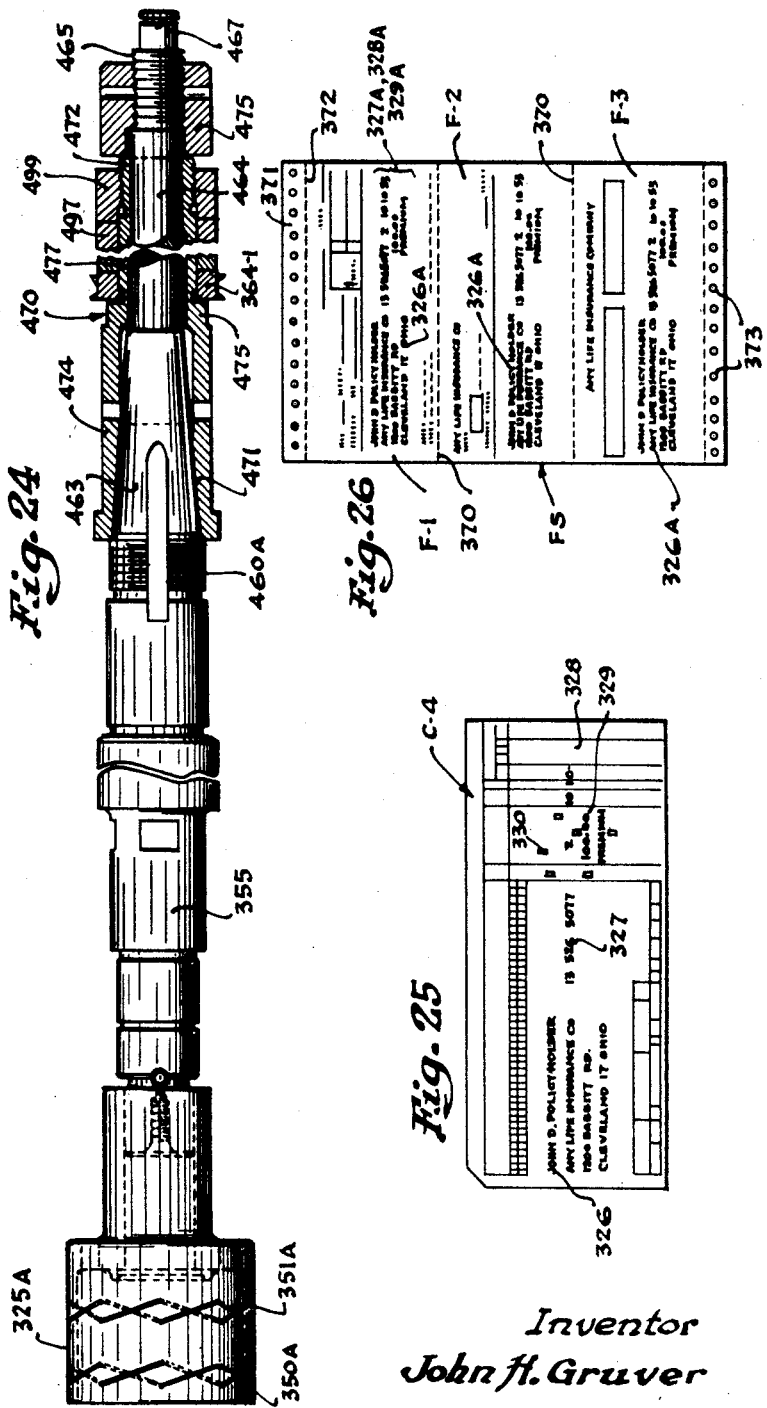

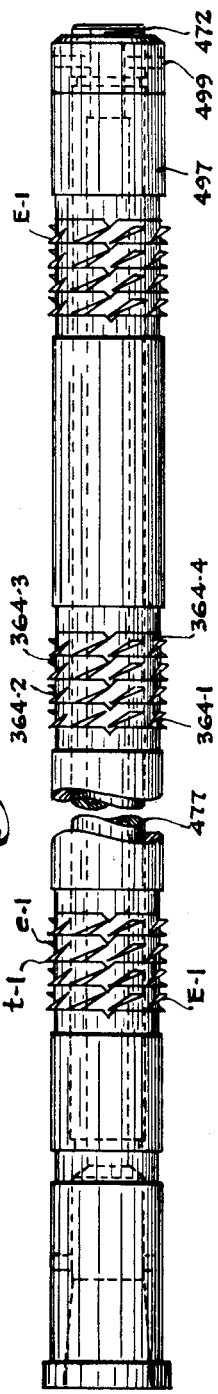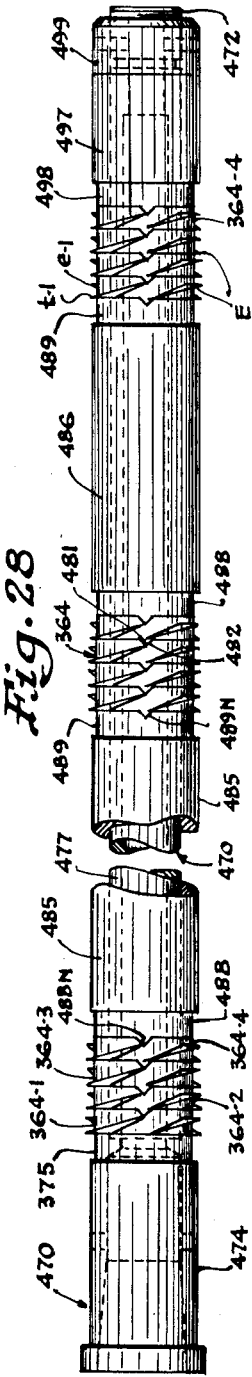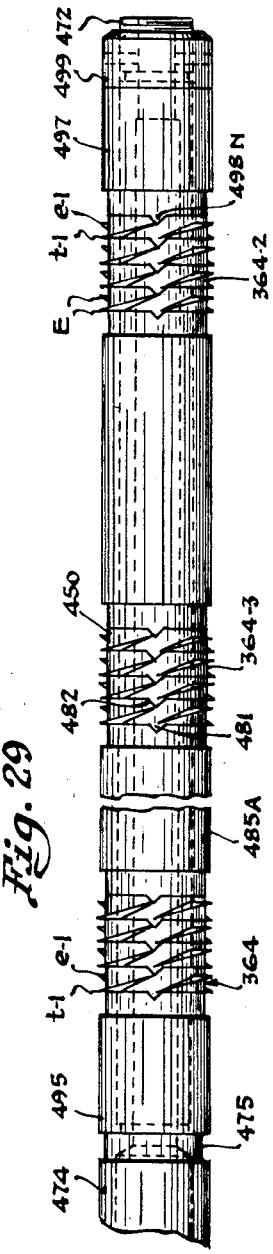

United States Patent Office 2,950,341
Patented Aug. 23, 1960

2,950,341

PRINTING MACHINES

John H. Gruver, Cleveland Heights, Ohio, assignor to Addressograph-Multigraph Corporation, Cleveland, Ohio, a corporation of Delaware Filed Mar. 10, 1958, Ser. No. 720,505

12 Claims. (Cl. 178—6.6)

This invention relates to a printing machine. This application is a continuation-in-part of each of my original applications Serial No. 502,932 filed April 21, 1955, now abandoned, and Serial No. 514,295, filed June 9, 1955, now abandoned.

In United States Patent Nos. 2,510,200, 2,529,978, 2,571,720, 2,571,785, 2,578,307 and 2,666,807 there is disclosed a printing machine operating on the principle of facsimile reproduction, and in the printing machine of these patents business instruments such as tabulating cards or the like bearing data are adapted to advance in sequence past an optical scanner rotatably supported at a scanning station. At the scanning station, data in the form of printed characters delineated on the individual business instruments are scanned, and these data are translated into signals by means including photo-electric cells receiving signals from the scanner at the scannng station. A sheet in the form of a web of paper or the like is brought into registry with a carbon strip at a printing station in the machine, and the sheet and the carbon strip are advanced together in juxtaposed relation past a printing anvil which moves synchronously with the aforementioned optical scanner. Cooperating with the printing anvil are one or more vibrators that are signally operated in accordance with the signals emitted at the scanning station, and the arrangement is such that each such vibrator is operative to reproduce on said sheet a line of the data that was scanned and translated into signals at the scanning station.

The printing machine described in the above-identified patents is adapted in particular for handling tabulating cards or the like each bearing data in the form of a printed address, and under such circumstances it is the addresses that are reproduced at the printing station on an address or mailing strip subsequently divided into individual address labels, premium notices, utility billings or the like, each bearing a different address and allocated to a different addressee.

The scanner of the aforesaid machine is in the form of a relatively small drum provided with an axially pitched scanning slot of narrow dimension, so that the scanning slot which is effective to pick up data of the aforesaid kind is helical in nature. The printing anvil at the printing station is also represented by a helix, and this helical printing anvil rotates synchronously with the scanning head.

Printing machines of this kind are used to print sheets of various orders. In some instances, the sheet is relatively narrow in width to afford address labels typically used in conjunction with the mailing of magazine subscriptions, and in these instances the printed lines comprising the addresses are relatively compact so far as spacing between the lines is concerned. In other instances, as in the mailing of utility bills, premium notices and the like, the sheet to be printed is relatively wide, and the addresses need to be oriented with respect to so-called form data that may appear on such sheets. Still further, there are circumstances where it is desired that the printed characters be of increased dimension, depending upon the size or form assumed by the sheet to be printed. Accordingly, it is the primary object of the present invention to enable these differing requirements, consistent with the nature of the sheet to be printed, to be accommodated in a printing machine of the foregoing kind.

As was noted above, the scanning drum and the helical printing edge in the aforesaid printing machine are driven synchronously, and this has been attained by arranging the scanning drum and the helical printing anvil for rotation on a commonly driven shaft. A more specific object of the present invention is to form individual disks with a series of regular pitched printing edges in spaced relation about the periphery thereof, and to assemble these disks on a shaft so as to be driven synchronously with the scanning head. In this manner, the disks are respectively allocated to a different line of data to be reproduced or printed at the printing station, thereby making it possible to select and readily assemble disks having printing edges of different pitch to vary the height of the characters printed at the printing station, and to enable these disks to be selectively located at different axial locations along the shaft at the printing station to vary the spacing between the lines of reproduced data, these selections being consistent with the form of the copy sheet used during a particular printing run.

As pointed out hereinabove, various types and kinds of sheets may be printed to advantage by the printing machines of the foregoing kind. A typical application for such machines is in the preparation of notices of insurance premiums, which notices bear the address of the policyholder and the data pertaining to the amount due. Frequently, it is highly advantageous to prepare substantially identical copies of the premium notices at the time the notices themselves are printed, the copies being employed for bookkeeping purposes and as records of the data appearing on the notices as mailed to the policyholders. The accomplishment of printing operations of this kind constitute one of the major objects of the present invention.

More specifically, an object of the present invention is to embody in a machine of the foregoing kind a plurality of printing stations each controlled by a single typical scanner so that the data covered by the scanner is reproduced simultaneously and identically at each of several printing stations and upon a sheet having the corresponding number of forms imprinted thereon.

A further object of the present invention is to enable the position of the several printing stations to be varied with respect to each other in order to accommodate sheets of variable size or form.

Throughout this specification and in the appended claims, the term "identical" as it is used with regard to multiple recording of data, refers solely to identity of information, inasmuch as the size and spacing of lines or other fractional portions of the data may vary in the different recordings as pointed out hereinafter.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a diagrammatic view showing typical apparatus determining the paths of the copy strip and the carbon strip to, through, and out of the printing station;

Fig. 2 is a diagrammatic view of the scanning and the printing stations;

Fig. 2A is a view showing the scanning drum in section and the disks at the printing station in plan;

Fig. 2B is a view showing a tabulating card and one kind of sheet printed therefrom;

Fig. 2C is a view showing a tabulating card and another kind of sheet printed therefrom;

Fig. 3 is a sectional view showing the arrangement of the scanning drum and the disks formed with printing edges assembled on a commonly driven shaft;

Fig. 4 is a horizontal sectional view of parts at the printing station;

Fig. 5 is an inside plan view of the printing vibrators in unfolded relation and on reduced scale as compared to Fig. 4;

Figs. 6, 7, 8 and 9 are plan views of disks formed with printing edges;

Figure 10:
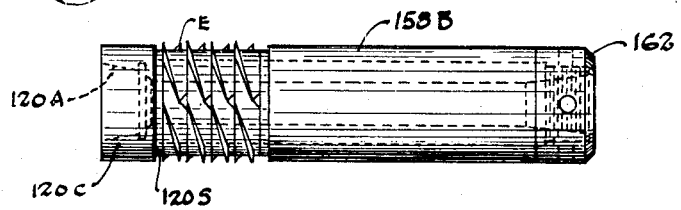
Figure 11:
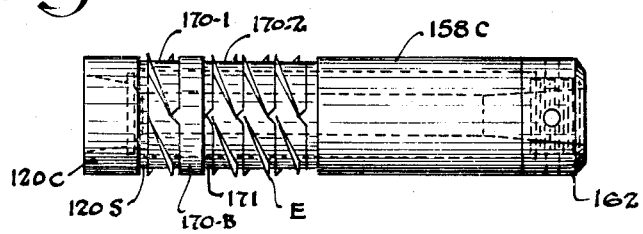
Figure 12:
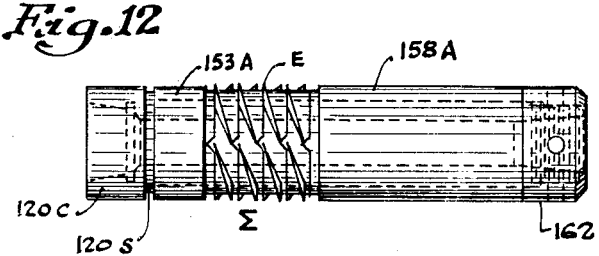
Figure 13:
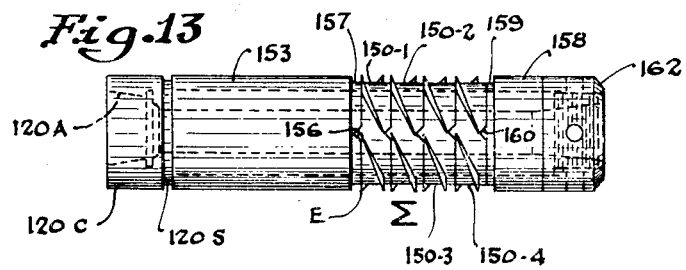
Figure 17:
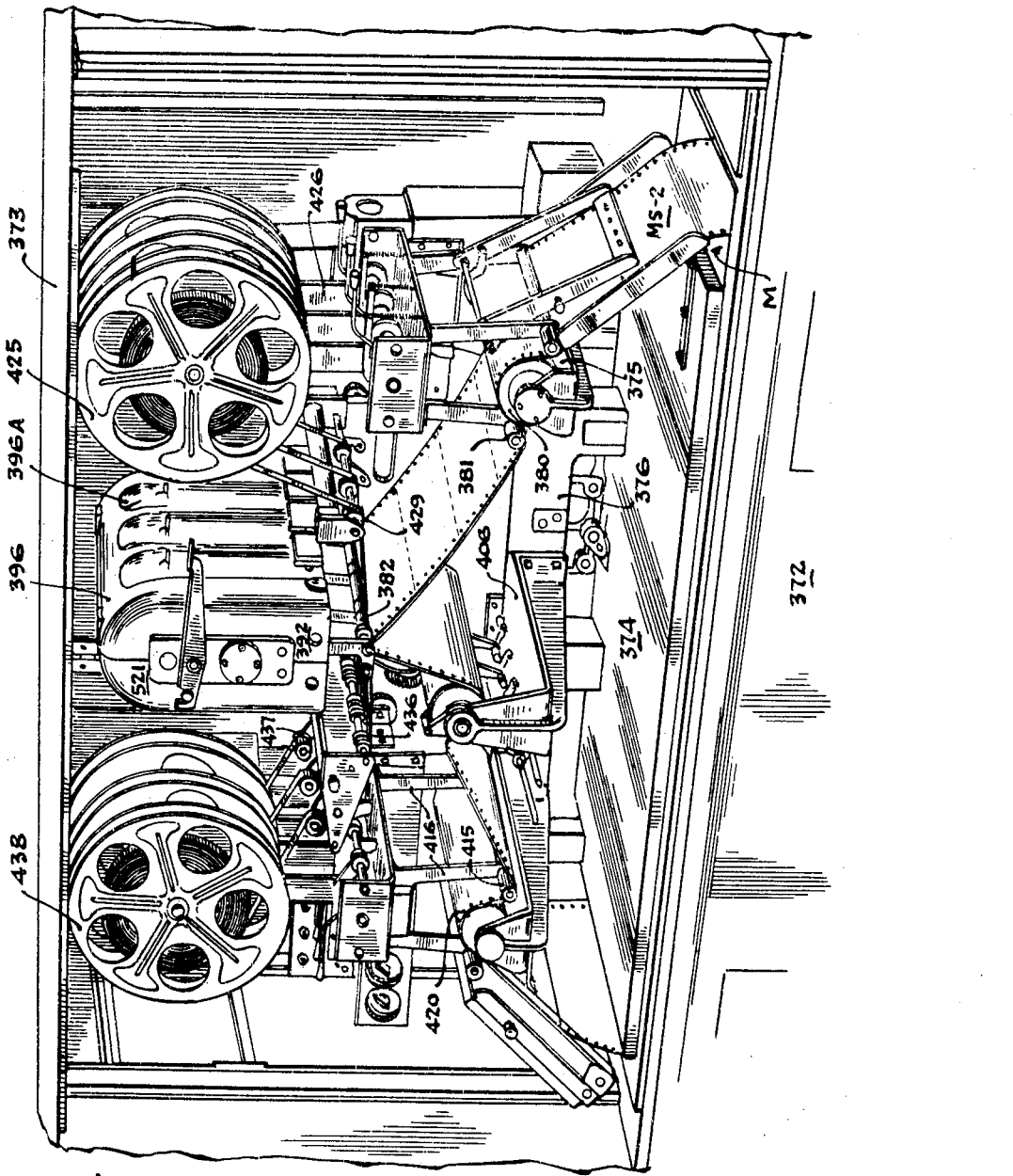
Figure 23:
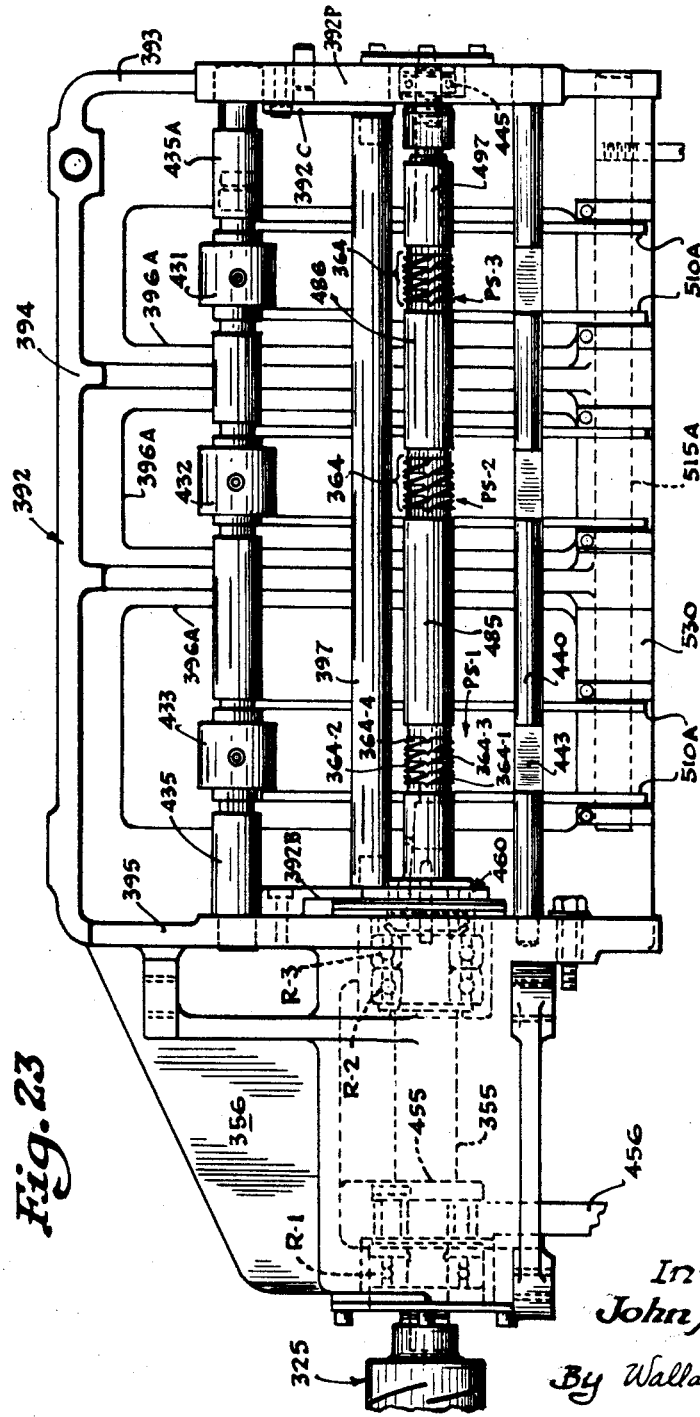

Figs. 6A to 9A inclusive are developments in a flat plane of the disks shown in Figs. 6 to 9 inclusive;

Fig. 10 is an elevation view of anvil disks constructed in accordance with the invention assembled on a printing station shaft;

Figs. 11, 12 and 13 are elevation views similar to Fig. 10 but illustrating other embodiments of the invention;

Fig. 14 is a sectional view of a modified construction;

Fig. 15 is a plan view of assembled disks as used with the arrangement shown in Fig. 14;

Figs. 16, 16A and 16B are schematic descriptive views showing progressive action at the scanning station;

Figs. 16–1, 16A–1 and 16B–1 are schematic views showing the progressive action that occurred at the printing station;

Fig. 17 is a prospective front view of another embodiment of apparatus constructed in accordance with the invention;

Fig. 18 is a prospective view of the back of the machine shown in Fig. 17;

Fig. 19 is a diagrammatic view of the scanning and printing stations of the printing machine illustrated in Fig. 17;

Fig. 20 is a view showing the scanning head and printing station of the printing machine of Fig. 17, partly in section, as viewed from above;

Fig. 21 is an enlarged prospective view of the printing stations of the printing machine of Fig. 17;

Fig. 22 is a fragmentary prospective view of a portion of the printing station;

Fig. 23 is an elevation view of the printing station of the embodiment of Fig. 17;

Fig. 24 is an elevation view, partly in cross-section, of the drive shaft which carries the scanning head and certain of the means used for printing in the embodiment of Fig. 17;

Fig. 25 illustrates a typical tabulated card which may be utilized in the printing machine of Fig. 17;

Fig. 26 illustrates a typical form to be printed by the machine of Fig. 17; and

Figs. 27, 28 and 29 are elevation views showing different relations of the printing stations in the printing machine illustrated in Fig. 17.

In Figs. 1 and 2 there is illustrated diagrammatically a typical embodiment of a printing machine used for facsimile reproduction in accordance with the aforementioned patents, and printing machines of this kind are adapted particularly for handling individual business instruments such as tabulating cards C, Fig. 2.

Typical of the tabulating cards C are the tabulating cards C–1 and C–2 illustrated in detail in Figs. 2B and 2C, respectively, and it will be observed that the cards C–1 and C–2 are shown as each delineated with printed data in the form of addresses as 10 and 11 in an area of the card that is allocated particularly thereto. As will be described, the data 10 and 11 carried by the cards C are to be printed on a sheet such as a mailing strip MS, Fig. 2.

The cards as C–1 and C–2 in addition to the addresses 10 and 11 may carry other printed data such as 15 and 16, and such other data may be information pertaining to the addresses such as subscription status, policy term, utility consumption and the like and may or may not be reproduced at the printing station. Thus, as shown in Fig. 2B, it will be observed that an address 10A identical to the address 10 on the card C–1 has alone been printed on a corresponding mailing strip MS–1, and in Fig. 2C it will be noted that two groups of data 11A and 16A have been printed on a mailing strip MS–2, these separate groups of data in this instance corresponding to the address 11 and the other data 16 carried by the card C–2. Each tabulating card as C–1 and C–2 is ordinarily provided with control data in the form of punched openings 20 and 21 of the usual kind that are used, as is well known in the art, for purposes of sorting, selection, collating and like operations performed on the individual cards under control of the punched hole data 20 and 21.

The tabulating cards are ordinarily arranged in a stack S, Fig. 2, at the back of the machine, and means (not shown) are effective to advance the cards one by one in a forward direction along a path P–1 and then at right angles laterally along a path P–2 through the machine. As described in my application Ser. No. 347,600, filed April 8, 1953, the cards as C advanced along the path P–2 may do so in end-to-end relation exposing the entire data-bearing face of each card, or the cards may be overlapped so that portions only of the data such as the addresses as 10 and 11 alone are exposed. It will be recognized from this that the extent to which the cards are exposed as aforesaid determines the extent to which all or a portion only of the data printed thereon is revealed, and such relations in turn may be used for selecting the amount of data to be reproduced on the copy strip as was mentioned above in connection with the mailing strips MS–1 and MS–2 and as will be appreciated more fully from the description to follow.

Disposed along the path P–2 for the business instruments through the machine is a scanning head in the form of a drum 25, Fig. 2, located at what constitutes a scanning station. The scanning head 25 is carried at one end of a shaft 27 rotatably supported in a bearing member 26, and this shaft is driven clockwise as viewed in Fig. 2 by means such as those described in the above-identified patents and my aforesaid application.

Formed about the drum 25 are two circumferential rows of scanning slots 30. In the present instance, each such row of slots comprises four slots 30 so that there is a slot for each ninety degrees of rotation of the scanning head. As shown in Fig. 2A, the scanning slots 30 are pitched axially on the scanning head 25 so as to scan from bottom to top the full height of the data characters reflected from the cards C into the scanning head in a way now to be described.

For purposes of simplicity, the printed data carried by the cards C which are to be scanned by the scanning head 25 are shown in Fig. 2 as comprising four lines "A1," "B2," "C3" and "D4" arranged in the usual way one under the other as representative of a different four-line address on each card. At the scanning station are a pair of lamps 33 and 34 and a corresponding pair of concentrating lenses 35 and 36 which are used to illuminate a pair of relatively narrow vertical bands 43 and 44 on a pair of immediately adjacent cards C traversing the scanning station along the path P–2. Objective lenses 45 and 46 are positioned above the illuminated bands 43 and 44, and these lenses reflect inverted images of the printed characters comprising the lines of data "A1" through "D4" delineated on the cards C to a pair of forty-five degree mirrors 47 and 48.

The inverted images transmitted to the mirrors 47 and 48 are reflected through corresponding slits 49 and 50 formed in a pair of aperture plates 51 and 52 which are positioned at either side of the scanning head 25, and the arrangement of lenses is such that inverted images of the second and fourth lines on the cards C represented in the present instance by "B2" and "D4," Fig. 2A, are directed through the slit in the aperture plate 52 while the first and third lines printed on the cards C and represented in the present instance by "A1" and "C3," Fig. 2A, are passed through the slit in the aperture plate 51 toward the scanning slots 30.

From Figs 2 and 2A it will be seen that the scanning slots 30 which are in the row on the near side of the bearing member 26 scan the third and fourth lines delineated on the cards C while the scanning slots on the far side of the bearing member 26 scan the first and second lines. Preferably the arrangement of the parts thus far described is such that the scanning slots 30, in each instance traversing the slits in the aperture plates 51 and 52 during rotation of the scanning drum, do so from what constitutes the bottom to what constitutes the top of the inverted characters as these characters in turn traverse in rapid succession the aperture slits 49 and 50 at right angles to the longitudinal axes thereof. In other words, considering the inverted character "2" shown in Fig. 2A it will be seen that incremental portions defining this character will be reflected successively by the mirror 48 to the slit 50 due to motion of the card as C through the scanning station, and these portions are scanned in succession by the slots 30 adjacent the open end of the drum 25 as these slots rapidly traverse the slit in the aperture plate 52 from the end nearer the bearing member 26 gradually forwardly to the end of the slit 50 away from the bearing member 26. It will be appreciated that this scanning action is one of exceedingly high speed.

Arranged within the scanning head 25 are four mirrors 55. Each such mirror is allocated to a line of data scanned, so that there is a mirror 55 behind the scanning slots at either side of the scanning head 25, and these mirrors are arranged as shown in Fig. 2A, and as described in the above-identified patents, to reflect the incremental portions of the images passing through the scanning slots outwardly to photocells adjacent the scanning head (not shown) which are correspondingly four in number. Thus, as incremental portions of the inverted characters successively traverse the slits in the aperture plates 51 and 52 these portions are translated into signals discontinuous in time by the scanning slots rapidly traversing the slits in the aperture plates; that is to say, the narrow bands of light directed through the slits in the aperture plates 51 and 52 toward the mirrors 55 within the scanning head are interrupted momentarily each time a "black" portion of a character is revealed to one of the scanning slots in the scanning head. It would be but a coincidence were the scanning slots to pick up "black" signals simultaneously. Consequently, as will be described, the light signals directed to the aforesaid photocells by the mirrors 55 within the scanning head are discontinuous in time and have no space significance or phase relation as such, so that it will be seen that the normal spaced definitions of the characters in printed form on the cards C are translated into signals having time significance alone at the scanning station.

The foregoing will be best understood by reference to Figs. 16, 16A and 16B where it is demonstrated schematically that due to movement of the cards as C the characters as "B" and "D" appearing thereon traverse the slits 48 and 49 in the aperture plates at right angles to the longitudinal axis of the slits as indicated by the arrows a. In the case of printed characters such as "B" and "D," the full length of the initial portion of these characters exposed within the aperture slit as shown in Fig. 16 is swept out rapidly from bottom to top by a single traverse of one of the pitched scanning slots 30 on the scanning head 25 moving past the aperture slit as indicated by the arrow b in opposition to the character to be scanned. Consequently, the beams of light transmitted to the corresponding photocells as above described are interrupted by two "black" signals each having a relatively long duration, as indicated in Fig. 16, inasmuch as these "black" signals will have a duration corresponding to the full sweep of the scanning slots relative to the aperture slits in which the initial portions of the characters "B" and "D" are exposed.

On the other hand, the characters "B" and "D" include remaining portions which in several instances will occupy but mere "spots" within the slits in the aperture plates 51 and 52, so that subsequently the beams of light transmitted to the corresponding photocells are interrupted by "black" signals of momentary duration in contrast to the initial "black" signals mentioned above. Moreover, in one sweep of the scanning slots 30 past the aperture slits, there may be several such "black" signals of short duration spaced apart in time as indicated in Figs. 16A and 16B.

Thus it will be seen that the signals transmitted to the photocells by the mirrors 55 within the scanning head are of significance only with respect to time, and it follows that the signal received by the photocells have no image form as such.

The sheet MS to be printed in the present instance is in the form of an endless web as shown in Fig. 1 and is supplied from a supply reel 60 as described in Patent No. 2,571,785 in the above-identified group of patents. This sheet to be printed is directed from the supply reel 60 horizontally along a pair of spaced apart guide rollers as 61 and then upwardly by a guide roller 62 about a segmental show 65 where the sheet MS is reversed downwardly to a guide roller 66, then horizontally to a guide roller 67, and then in the return direction horizontally to a guide roller 68. As shown in Fig. 2, the sheet MS includes spaced apart perforations 70 the spacing between which defines the length of an individually severable address label, and these perforations are adapted to be registered with feed pins 71 disposed in corresponding spaced relation about the periphery of a feed sprocket 75, Fig. 1. Thus, the strip MS is directed from the feed roller 68 downwardly and then upwardly about the lower peripheral section of the feed sprocket 75, and then is directed in upward inclined relation along a guide shoe 77 and from this to a take up reel 78. Under most circumstances, the speed of the sheet MS to be printed corresponds to the speed of the cards as C to and through the scanning station.

As shown in Fig. 1, the sheet MS to be printed passes upwardly and then downwardly in close proximity to the shaft 27 that carries the scanning head 25, and as will be described this takes place at the printing station in the machine in such a way that the second and fourth lines of the data to be reproduced are printed during the upward pass of the sheet MS with respect to the shaft 27 while the first and third lines are printed during the course of downward movement of the sheet MS with respect to the shaft 27. This will be more apparent from Fig. 2 wherein it will be noted that the strip MS reversing from an upward to a downward pass at the printing station bears data "B2" and "D4" representative of the second and fourth lines of reproduced data, whereas it is not until the strip MS has advanced beyond the shaft 27 in its downward pass that the first and fourth lines of data are filled in.

At the printing station, and on either side of the shaft 27, a carbon strip CS, Fig. 1, is brought into registry with the sheet MS to be printed. The copy sheet MS and the carbon strip CS are fed out at the same speed, and the relation is such that the carbon strip is disposed outwardly of the sheet MS. The carbon strip CS is supplied from a supply reel 80 and is first directed downwardly about a guide roller 81, then horizontally to a guide member 181 to be described, and from the guide 181 upwardly about a guide roller 85 which is on a vertical center line with the shaft 27 and the guide shoe 65. From the guide roller 85, the carbon strip passes downwardly about a guide 180 to be described where the carbon strip diverges from the copy sheet, and then horizontally to a guide roller 87. From the guide roller 87, the carbon strip passes upwardly to a guide roller 88 and finally to a take-up reel 90. It will be recognized from Fig. 1 that at the printing station the carbon strip CS is juxtaposed with respect to the copy strip MS at either side of the shaft 27 and that after the second and fourth lines are printed the two strips assume divergent paths.

As described in the aforesaid patents, the printing station of the machine includes a rotating helical printing edge that rotates opposite an electromagnetically controlled vibrator signally operated from the photo cells at the scanning station to reproduce on the sheet MS the data collected by the scanning head and translated into signals by the means described above cooperating therewith. This vibrator is of the kind disclosed in U.S. Patent No. 2,646,518, there being four such vibrators 95-1, 95-2, 95-3 and 95-4 illustrated diagrammatically in Fig. 2A hereof, one for each of the four lines of data to be printed at the printing station.

The vibrators 95 each include a narrow-edged blade as 96, and it is these blades which are driven against the helical printing edge for the duration of a "black" signal as will be described. Thus, the arrangement is such that the sheet to be printed and the superimposed carbon are passed together between a rotating helical printing edge and the blade of a corresponding vibrator as 95, Fig. 2A, which is electromagnetically operated. Each time a "black" signal is recorded by a photo cell, the blade as 96 of a vibrator as 95 corresponding thereto presses the carbon and the sheet to be printed against the helical printing edge which is rapidly turning synchronously with the scanning head. The vibrator will be operated in this manner for the duration of each such "black" signal to develop marks on the copy sheet which are oriented in space as the signals are oriented in time.

In Fig. 16 hereof, the scanning slots 30 are shown at the threshold of a scanning action from bottom to top on what normally constitute the vertical portions of the characters "B" and "D" which are shown exposed together within the aperture slit 50.

In Fig. 16-1, the result at the printing station of the scanning action that occurred in accordance with Fig. 16 is illustrated wherein a pair of printing edges E of a kind to be described have developed the vertical portions of the characters "B" and "D" on the sheet to be printed accordingly as the corresponding vibrators 95 were excited for a relatively long duration. It should be mentioned for purposes of understanding that the movement of the printing edges E is synchronized to the scanning slots 30, so that for each slot 30 there is presented an edge E during rotation of the shaft 27.

Thus, Figs. 16-1, 16A-1 and 16B-1 are advanced 90° in phase as compared to Figs. 16, 16A and 16B, and as the leading ends e of the scanning slots 30 first picked up the bottoms of the vertical portions of the characters shown in Fig. 16 as exposed within the aperture slit 50 resulting in the commencement of a pair of "black" signals, the vibrators at the printing station were excited and driven against the leading ends e–1 of the pitched printing edges E rotating beneath the copy sheet in the direction of the arrows m, and as the trailing ends t of the scanning slots 30 passed beyond the aperture slit 50, the vibrators at the printing station were for the first time rendered inoperative to print or develop a mark as the trailing ends t–1 of the printing edges E passed beyond the vibrators. In this manner, the vertical portions of the characters "B" and "D" were individually developed at the printing station as the result of signals of longest duration.

As indicated in Figs. 16A and 16B incremental portions of the characters to be scanned were progressively presented to the aperture slits due to the movement of the cards C along the path P–2, Fig. 2, and as this progressive movement occurred corresponding signals progressive in time were transmitted to the printing vibrators as 95, and due to the movement of the copy sheet through the printing station these progressive signals resulted in progressive development of the characters on the copy sheet at the printing station as shown in Figs. 16A-1 and 16B-1, the vibrators having been operated for the duration of each "black" signal that originated at the scanning station. With a subsequent sweep of a scanning slot past an aperture slit, several such "black" signals were created for each character as shown in Figs. 16A and 16B, and the vibrators 95 were operated several times to develop corresponding marks in spaced relation on the copy sheet within the duration of corresponding sweep of the printing edges E moving synchronously with the scanning slots as shown in Figs. 16A-1 and 16B-1, bearing in mind that the printing edges E for purposes of explanation have been advanced 90° in phase as compared to the scanning slots in Figs. 16, 16A and 16B. In this connection, it is to be noted that the sheet to be printed is continuously advancing through the printing station past a base line represented by the blade of a vibrator as 95, so that there is relative movement of the copy sheet with respect to the printing vibrators 95. Thus, as each new increment of a character to be scanned is presented to the aperture slits as 50, new increments of the copy sheet are presented to the printing vibrators to progressively develop fully each character that is scanned.

The scanning head, Fig. 3 is fixed at one end to shaft 27, and the bearing member 26 that rotatably supports shaft 27 is in the form of a casting that houses respective sets of ball bearing races R–1 and R–2 in which the shaft 27 is centered for rotation. Keyed to the shaft 27 within the open portion of the bearing housing 26 between the respective sets of ball bearings is a pulley 101 about which a belt (not shown) is adapted to be passed to drive shaft 27.

The shaft 27 is extended beyond the bearing housing 26 in the direction of an outboard bearing member 104. This bearing member is integral with a bracket arm 105, Figs. 3 and 4, and the bracket includes a mounting flange 105F disposed in a vertical plane which is anchored as by bolts 105B to a face of the bearing member 26 as shown in Figs. 3 and 4.

The bearing member 104 includes a ball bearing race R–3, Fig. 3, in which the outboard end of shaft 27 is rotatably supported, and in this way shaft 27 is constrained against lateral or vertical vibration.

Adjacent the portion supported by the ball bearing race R–2, shaft 27 is threaded at 106T, and beyond this threaded portion is tapered inwardly at 107. Beyond the taper 107, shaft 27 is further reduced to a uniform diameter at 110, and this reduced portion or shank of the shaft is of relatively long dimension as can be seen in Fig. 3. Beyond the reduced shank portion 110, shaft 27 is then enlarged uniformly at 113, threaded at 114T and then again reduced uniformly at 115 at the portion that is to be rotatably supported in the outboard bearing member 104.

A relatively long sleeve 120 having a bore of larger diameter than the outside diameter of the portion 110 of the shaft 27 is concentrically assembled on shaft 27 to rotate therewith. The bore of the sleeve 120 at one end is enlarged and tapered at 120A complementary to the tapered portion 107 of shaft 127, so that these respective tapered surfaces are adapted to frictionally mate. The opposite end of the bore in the sleeve 120 is likewise tapered internally at 120B, but this taper is enlarged with respect to portion 113 of shaft 27 to enable a complementary tapered collar 121 to be assembled on the enlarged portion 113 of the shaft 27 to engage the internal tapered surface 120B of the sleeve 120. The collar 121 is adapted to wedgingly seat in the end of the sleeve 120 by a nut 125 assembled on the threaded portion 114T of shaft 27, and at the opposite end of shaft 27 another nut 126 is assembled on the threaded portion 106T thereof to engage the corresponding end of the sleeve 120. From the foregoing, it will be seen that the sleeve 120 will rotate with shaft 27, and this sleeve serves to carry disks of the kind shown in Figs. 6 to 9 as will now be described.

One of the important aspects of the present invention is that the height of the characters reproduced at the printing station and the spacing between the lines of data thus produced may be selectively varied, and this is achieved by assembling on sleeve 120 of shaft 27 a set of individual disks of which the disks 136, 137, 138 and 139, Figs. 6 to 9, are typical. Each such disk is formed on the periphery with a plurality of projecting triangular printing edges E that are developed in an axial pitched relation circumferentially about each disk, so that during rotation with sleeve 120 the edges E will traverse the vibrators as 95 as shown for example in Fig. 16–1.

The number of such printing edges E on each disk corresponds to the number of scanning slots 30 in a circumferential row of the scanning head 25. Thus, as was described above, there may be four scanning slots 30 at 90° intervals about the scanning head, and under such circumstances the disks of Figs. 6, 7 and 8 may be used therewith wherein each such disk includes four printing edges E disposed at 90° intervals thereabout. It will be noted that disk 139, Fig. 9, is formed with eight edges E, and the significance of this will be explained.

Figs. 6A to 9A inclusive are developments in a flat plane of the disks shown in Figs. 6 to 9 inclusive, and it will be observed that the edges E in each instance are so arranged on each disk that as the trailing end t–1 of one printing edge E passes beyond a given line, the leading end e–1 of the next following printing edge E is at the threshold of the same given line. The given line under the present disclosure is represented by the blade as 96 of a printing vibrator as shown particularly in Fig. 2A. Thus, as will be described, there is a disk as 136, 137, 138 or 139 allocated to each of the vibrators 95–1, 95–2, 95–3 and 95–4 at all times in those instances where four line addresses, for example, are to be printed at the printing station. Usually, the disks in a set will be the same, but variations within the set of disks are possible as will be explained. In this connection, it will be recalled that reference was heretofore made to the fact that the scanning slots in each row in the scanning head are so arranged that as the trailing end t of one slot passes beyond a given line represented by the aperture slit the leading end e of the next following slot is at the threshold of this given line. Since the number of scanning slots in such rows will correspond to the number of printing edges E, and since these respective elements are displaced at 90° intervals about the scanning head on the operative disks, respectively, it follows that movement of the leading and trailing ends thereof, e and e–1 and t and t–1, will be synchronized.

The disks as 136, 137, 138 and 139 are bored to the outside diameter of the sleeve 120 to enable selected ones of such disks to be assembled by a press fit on sleeve 120 for rotation with the drive shaft 27 as shown in Fig. 3. Thus, a disk of the foregoing kind as 150–1, Figs. 3 and 13, corresponding to the first line of data to be reproduced at the printing station is located in predetermined axial position on the sleeve 120 depending upon which portion of the sheet to be printed is to be allocated to the first line of data to be printed thereon. Such positioning of the first disk 150–1 is afforded by selecting a spacer sleeve as 153, Figs. 3 and 13, consistent with the desired position for the initial disk 150–1, and this sleeve is the one that is first telescoped on to sleeve 120. Thus, with respect to the different widths of sheets to be printed as MS–1 and MS–2 illustrated in Figs. 2B and 2C, it will be recognized that these will be determinative of the length of the spacer sleeve as 153 to be selected. In Fig. 12, for instance, it will be observed that a spacer sleeve as 153A is used for shorter length as compared to the spacer 153, and accordingly, the printing station in this instance would be shifted axially inwardly along the sleeve 120 as compared to the position of the printing station in Fig. 3.

To accurately locate the spacer as 153 or 153A, the sleeve 120 at the end corresponding to the tapered portion 120A includes an enlarged collar 120C, Figs. 3 and 13. The collar 120C includes an annular shoulder 120S about the outboard end, and this shoulder serves as an abutment adapted to be engaged by the corresponding inboard end of the spacer sleeve.

As shown in Figs. 6, 8 and 9 the disks 136, 138 and 139 each include a pair of V-shaped noses or nibs as 155 located in diametrical positions about one of the circumferential side edges thereof, and at the opposite side edge the disks are formed with complemental V-shaped notches 155N likewise at diametrical opposed positions. The noses and complemental notches thus formed in the disks serve to lock the disks together for synchronized rotation with the shaft 27 as will now be described.

Thus, where the printing disk as 150–1 allocated to the first line of data to be printed includes noses as 155, the end of the spacer 153 opposite the end that engages the shoulder 120S on the collar 120C is formed with a pair of complemental notches 156, Fig. 13, and these notches 156 are formed in a shoulder 157, Figs. 3 and 13, of reduced diameter at this end of the sleeve 153. Accordingly, the disk 150–1 is assembled on the sleeve 120 so that the nose elements thereof mate in the notches as 156 as shown in Fig. 13.

It should here be pointed out that it is not essential that the disk allocated to the first line of data include nose elements of the foregoing kind. Thus, the first such disk may be a disk as 137, Fig. 7, which it will be noted does not include nose elements as 150 about the edge thereof that is opposite the edge formed with notches 137N, and the reason for this will be pointed out herein below.

In this manner, successive ones of the disks, 150–2, 150–3 and 150–4, Figs. 3 and 13, are next assembled in side by side relation on the sleeve 120 progressively outboard of the disk 150–1 so that the nose elements of one disk seat in the complemental notches in the next innercost disk.

For purposes of disclosure, it is assumed that four lines of data are to be printed at the printing station. Thus, the last disk, that is, 150–4 which is the one allocated to the fourth line of data, will have the notches thereof opening toward the outboard bearing member 104, and as shown in Fig. 3, this last disk 150–4 is spaced inwardly of the outer free end of the sleeve 120. An outboard spacer 158 is then pressed onto this free end of the sleeve 120, and the spacer 158 at the inner end thereof is formed with a shoulder 159 of reduced diameter. The shoulder 159 on the outboard spacer 158 includes a pair of nose elements 160, Fig. 13, of the foregoing kind, and these nose elements are adapted to mate in the aforesaid exposed notches of the last or outermost disk 150–4. A lock nut 162 is then threaded onto the threaded end 165, Fig. 3, of the sleeve 120, and the lock nut 162 is tightened to lock the assembled disks 150–1 through 150–4 tightly together for synchronized rotation.

As was noted hereinabove in connection with the inboard spacers 153 and 153A, Figs. 13 and 12, respectively, such spacers enable the printing station to be selectively located along the shaft 127. The dimensions of the shaft 27 under most circumstances will not be changed, and hence the length of the outboard spacer as 158 to be selected will vary depending upon the location of the printing station as aforesaid. Thus, as in the instance of Fig. 12 where a relatively short spacer 153A was described, an outboard spacer 158A will be resorted to of greater length as compared to the spacer 158 in Figs. 3 and 13.

In some instances the printing station afforded by the disks as described above, which are varied in number depending upon the number of lines of scanned data that are to be printed, will be located entirely inboard with respect to the sleeve 120 that is driven with shaft 27.

In Figs. 10 and 11, this aspect of the invention is illustrated, and it will there be observed that an inboard spacer as 153 or 153A is not resorted to. In these instances, the first disk that corresponds to the first line of data to be printed will be a disk as 137, Fig. 7, which, as was mentioned above, does not include noses as 155 formed about the inboard end thereof. Accordingly the inboard end of the disks as 137 will be pressed against the shoulder 120S of the collar 120C at the inboard end of the sleeve 120, and the other disks, Fig. 10, that correspond to the remaining lines of data to be printed are then assembled in side by side relation as above described with the nose elements of an outboard disk mating in the complemental notches formed in the adjacent end of the next inboard disk. Outboard spacers as 158B and 158C, Figs. 10 and 11, are then assembled on the free or exposed end portion of the sleeve 120, and these spacers are drawn up against the last disk by a lock nut as 162 as described above to lock the disks together and tightly clamp the assembled disks between the shoulder 120S on the collar 120C and the shoulder 159 formed about the inboard end of the spacer as 158B or 158C.

Under the present invention, variations of the characters printed at the printing station by the edges E on the disks 136, 137, 138 and 139 may be selected. Thus, disks wherein the edges E are adapted to produce characters of different height may be used, bearing in mind that the printing edges will be so formed as to be in phase with the scanning slots 30. In this connection, it will first be observed that the edges E on the disks 136, 137, 138 and 139 are adapted to produce characters of the same height, and the height of these characters will correspond to the axial displacement d, Figs. 6A, 7A, 8A and 9A, of the leading end e–1 of one edge E and the trailing end t–1 of the next edge E. As shown contrastingly in Figs. 12 and 13 it will be observed, however, that consistent with different requirements, sets of disks may be assembled in the sleeve 120 having printing edges E wherein the displacement is of different order, such being manifest in a printed character "M" in Fig. 13 that is of substantially greater height than the character "M" that would be printed by the disks of Fig. 12. Thus, to selectively vary the height of the printed characters at the printing station consistent with the form of sheet to be printed, it is merely necessary at the commencement of the particular printing run to select disks having edges E thereon displaced as aforesaid to produce characters of the desired height.

The space that separates the respective lines of printed data at the printing station may likewise be varied under the present invention. This aspect of the invention is most clearly illustrated contrastingly by the disks 137 and 138 in Figs. 7 and 8, respectively, wherein the disk 138 is of longer axial dimension in comparison with the disk 137. However, the displacement d of the printing edges E on these disks is the same, as was mentioned, such as to produce characters of the same height, and it will be recognized from the foregoing that disks as 138 when assembled in side by side relation at the printing station will reproduce lines of data wherein the spacing between the lines will be greater than in the instance of an assembled set of the disks 137, this being due of course to the free or blank portion of the disks 138 that is outboard of the leading ends e–1 of the edges E.

Under some circumstances, it is desirable that one or more lines of the printed data be distinctly separated. As an example, it may be desired to distinctly separate the addressee's name from the address per se, and under the present invention this may be attained by having resort to a blank disk interposed between adjacent disks having printing edges E on the periphery thereof. Thus, in Fig. 11 it will be observed that a blank disk 170B has been interposed between the disk 170–1 corresponding to the first line of data and the disk 170–2 corresponding to the second line of data. A blank disk of this kind, of course, is not formed with printing edges, and the diameter of the blank disk is such that the outer periphery thereof is of less diameter than the diameter of the printing edges E about disks as 170–1 and 170–2 having printing edges. The blank disk 170–B, however, is formed with nose elements of the foregoing kind which are adapted to seat in complemental notches in the adjacent edge of the first disk 170–1. The blank disk is formed with a shoulder 171 of reduced diameter, and this shoulder includes notches that are complemental to the nose elements of the disk 170–2 that is allocated to the second line of data to be printed. From this it will be seen that the interposed blank disk in Fig. 11 serves to enable the first line of data to be distinctly set apart a predetermined distance from the second, third and fourth lines of data.

Mention was made hereinabove that the sheet as MS, Fig. 4, to be printed is first directed upwardly at one side of the shaft 27 at the printing station and then is reversed in a downward direction by a guide shoe 65. In Figs. 3 and 4 it will be observed that the guide shoe 65 is in the form of a relatively long arcuately shaped plate which extends forwardly from the bearings member 26 in the direction of the bearing member 26 includes a flat mounting plate 65A, Figs. 3 and 4, secured to the bearing member 26 as by bolts 65B, and the opposite end the shoe 65 includes a depending plate 65C anchored to the bearing member 104 as by bolts 65D.

The relatively long dimension of the shoe 65 as viewed in Fig. 3 enables the sheet to be printed to be selectively oriented so that the sheet to be printed travels upwardly and then downwardly accurately in opposed relation to the printing disks having edges E at the printing station as will be observed in Fig. 4. The carbon strip CS, Fig. 4, travels generally parallel to the sheet MS to be printed, and it will be observed in Fig. 3 that the guide roller 85 which serves to reverse the carbon strip is suspended above the shoe 65, this relation being afforded by journaling guide roller 85 on an intermediate portion of a pin 174 anchored to the bearing member 26 so as to extend outboard therefrom in parallel relation to the guide shoe 65.

The printing vibrators 95–1, 95–2, 95–3 and 95–4 are arranged in a pair of left and right hand housings 175L and 175R, respectively, as viewed in Fig. 4, the arrangement being such that the blades as 96, Fig. 5, of the printing vibrators 95–2 and 95–4 are disposed in spaced relation within the housing 175R to print the second and fourth lines of data while the printing vibrators 95–1 and 95–3 are so disposed within the housing 175L as to print the first and third lines of data, this of course being in accordance with the way in which the lines of data are printed in pairs as described above.

The housings 175L and 175R for the printing vibrators are afforded by pairs of spaced apart plates as 176 and 177, Fig. 5, and these plates at the lower ends include apertures that embrace pivot pins 180 and 181. Rearwardly of the portions that serve to pivot the housings 175L and 175R, the pins 180 and 181 include enlarged shank portions 180A and 181A serving as spacers as will be described, and pins 180 and 181 also include reduced inner end portions as 180E and 181E which are adapted to be anchored in spaced relation at the lower end of the bearing member 26 as will be recognized from Figs. 3 and 4.

Thus, the pins 180 and 181 are so disposed as to locate the housings 175L and 175R with the printing vibrators exposed on opposite sides of the shaft 27 at the printing station, and the spacers 180A and 181A which constitute extensions of the pins 180 and 181 are so dimensioned as to position the printing vibrators with the blades 96 thereof disposed opposite the printing discs as 150–1, 150–2, 150–3 and 150–4 on the sleeve 120 that are allocated thereto. Further in this connection, it will be observed in Fig. 5, which is on a reduced scale, that the portions of the pins 180 and 181 that lie between the plates 176 and 177 serving to house the printing vibrators are on a center line with the roller 85 about which the carbon strip CS reverses. The sheet to be printed as shown in Fig. 4, is guided by these portions of the pins 180 and 181 that are thus between the mounting plates 176 and 177, and in this manner, the carbon strip and the sheet to be printed are accurately juxtaposed.

The housings 175L and 175R are adapted to be locked at upper ends to the pin 174 to assure that the printing vibrators are maintained in operative position. This is attained by forming inwardly extending ears 183, Figs. 4 and 5, at the upper ends of the plates 176 and 177, and these ears are adapted to fit into corresponding spaced apart grooves 174G formed in the pin 174 on opposite sides of the guide roller 85 carried thereby. A relatively large latch arm 184, Fig. 4, is pivotally mounted on a pin 175P which extends between the plates 176 and 177 constituting the housing 175L. The latch arm 184 is arched so as to extend across the roller 85, and at the side opposite that pivoted on pin 175P the latch arm includes a finger piece 185. The inner edge of the finger piece of the latch is formed with a cam portion 185C adapted to engage a pin 186 extended between the plates 176 and 177 which constitute the housing 175R, and to lock the vibrator housings to the pin 174 the latch arm is depressed to cause the cam edge 185C to bear on the pin 186 and such draws the two housings 175L and 175R inwardly to the extent that the ear elements thereof seat in the grooves 174G in the pin 174.

To space the sheet MS to be printed inwardly of the carbon strip so that there will be no tendency for carbon smudging or offsetting, a pair of parallel spaced apart guides 187 and 188 are secured to the outboard face of the bearing member 26 to extend forwardly, and the opposed passes of the sheet MS to be printed engage the inner edges of these guides as shown in Fig. 4. The guides 187 and 188 at the sides opposite those engaged by the sheet to be printed include flat portions 187F and 188F, and the carbon strip CS is so arranged as to travel on these flat portions, thereby spacing the carbon strip from the sheet to be printed. However, at the printing station where the carbon strip travels past the blades of the printing vibrators, the carbon strip is free to be driven inwardly against the copy sheet MS by the blades 96 of the printing vibrators in an excited state, and in this manner the carbon strip is pressed against the outer face of the sheet to be printed, and the inner face of the sheet to be printed opposite the blades 96 in turn is pressed against the particular printing edges E whereby the data that was scanned is printed in accordance with the description set forth hereinbefore. In this connection, it will be observed in Fig. 3 that the scanning slots 30 developed in pitched relation on the scanning head 25 are so arranged that the trailing end *t* of one such slot in a particular row is in axial alignment with the leading end *e* of the next following slot in the same row, so that as one scanning slot completes a traverse of the aperture slit allocated thereto the leading end of the next following scanning slot is just at the threshold of this aperture slit. In like manner, the printing edges E that rotate with respect to the inner face of the sheet to be printed, Fig. 3, do so synchronously and in phase with the scanning slots 30, so that as the trailing end of one such edge E travels past the blade 96 of the printing vibrator that is allocated thereto the leading end of the next following edge E on the same printing disk will be presented to the same blade 96.

When it is desired to substitute or interchange selected ones of the printing disks between printing runs, or to thread a new sheet to be printed or a new copy strip through the machine, the housings 175L and 175R are opened outwardly on the pins 180 and 181 by releasing the latch arm 184 to enable these changes to be made at the printing station.

In those instances where the sheets to be printed are repeatedly of such form as to be located relatively close to the bearing member 26, it is not necessary either to use a shaft as 27 of extended length or an outboard bearing member as 104, and in these instances a relatively short driven shaft as 200, Fig. 14, is utilized.

The shaft 200 is adapted to be supported rotatably in the bearing member 26 in the same manner as shaft 27 and hence the description in this regard need not be repeated. The portion of shaft 200 which is positioned just forwardly of the bearing member 26 is threaded at 201 and then is tapered inwardly at 204. Forwardly of the taper 204, shaft 200 is reduced to a uniform dimension at 205, enlarged at 206 to a uniform dimension and then is threaded at 208 at the outboard end. A lock nut 209 serving as a spacer is threaded on the portion 201 of shaft 200, and then a mounting sleeve 210 the bore of which at one end is tapered at 210A complementary to the tapered portion 204 of shaft 200 is pressed onto the exposed end of shaft 200 so that the tapered portions as thus afforded are frictionally engaged. At the end opposite the taper 210A, sleeve 210 is tapered outwardly at 210B, and this taper enables a complementary tapered collar 211 to be wedgingly inserted between the enlarged portion 206 of shaft 200 and the tapered end 210B of the mounting sleeve 210. A lock nut 213 is threadedly mounted on the threaded portion 208 of shaft 200 to so seat the collar 211 that the mounting sleeve 210 will be driven with shaft 200.

The form of the invention that was described in connection with Fig. 3 is one wherein there are four scanning slots 30 in a circumferential row about the scanning head 25, and wherein there are a corresponding number of printing edges E on each of the printing disks. The number of scanning slots and printing edges afforded for 360° of rotation may of course be varied, and in Figs. 14 and 15 one such variation is illustrated wherein the scanning head 25A includes eight scanning slots 30A in a circumferential row, and the printing disks will likewise carry eight printing edges E, the printing disks in this instance being of the kind 139 shown in Fig. 9.

Four such printing disks 139–1, 139–2, 139–3 and 139–4 are assembled in side by side relation on the mounting sleeve 210, and are arranged in such a manner that the eight printing edges E will be in phase with the eight scanning slots as 30A. Depending upon variations selected for line spacing, a spacer collar 215 is assembled on the sleeve 210 adjacent the printing disk 139–4 that is allocated to the fourth line of data to be printed, and this spacer is drawn up on the sleeve 210 by a lock nut 216 threadedly mounted on the outboard end of the mounting sleeve 210 to firmly lock the printing disks together for synchronized rotation as was described above.

From the foregoing it will be seen that in accordance with the present invention numerous variations are possible in the form of the data to be printed by a machine of the kind described, as enabled by individual printing disks that may be selected in accordance with the form desired.

In Fig. 19, another embodiment of the invention is illustrated diagrammatically; this embodiment is adapted particularly for handling individual business instruments such as tabulating cards C-4, Figs. 17 and 22, which are substantially similar to the cards C-1 and C-2 described hereinabove. As described in my aforementioned application Serial No. 347,600 the cards as C-4 are advanced one by one in the proper order along a path P-3, Fig. 19, to travel beneath a scanning head 325 where the data appearing thereon are scanned optically in essentially the same manner as described hereinbefore.

Each tabulating card C-4, Fig. 25, carries a printed address 326 which typically includes four lines as shown. In addition, the cards C-3 may carry printed data 327 pertaining to an insurance policy number, data as 328 pertaining to the premium due date, and still further printed data 329 representing a statement of the premium amount due. The tabulating cards C-4 may contain control data in the form of punched openings 330 of the usual kind used for sorting, selection and tabulating as is well known.

The various kinds of data which thus appear in predetermined lines or rows on the tabulating cards C are represented in Fig. 19, as before, by printed data "A1," "B2," "C3" and "D4" typifying the usual four line arrangement. As the cards are directed along the path P-3 these data are first viewed by a pair of objective lenses 335 and 336, Fig. 19, which are disposed in predetermined spaced relation at opposite sides of the scanning head 325. Light beams from a pair of lamps 338 and 339 are concentrated by a pair of lenses 341 and 342 to illuminate narrow bands on the cards C-3 where the data to be scanned appear. Above the objective lenses 335 and 336 are a corresponding pair of reflecting mirrors 344 and 345 which receive from the lenses 335 and 336 inverted images of the printed data appearing on the cards C-4, and these inverted images are directed through narrow apertures in a pair of aperture plates 347 and 348 disposed adjacent the scanning head 325 on either side thereof.

The scanning head 325, like the head 25 of the first-described embodiment, is in the form of a drum having two spaced-part circumferential rows of narrow scanning slots 350 and 351. The scanning slots 350 are pitched axially of the drum 325, and in the present instance are arranged at 90° intervals so that the leading end of one slot in one row is immediately opposite the trailing end of the next scanning slot in the same row. While there are four scanning slots in each row about the scanning head 325 as shown, Fig. 19, this may be varied as explained hereinbefore.

The scanning head 325 is carried at one end of a driven shaft 355 rotatably supported in a bearing housing 356. The scanning head 325 rotates clockwise as viewed in Fig. 19, so that the scanning slots 350 and 351 traverse the apertures in the aperture plates 347 and 348, and it will be recognized that this action is progressive from the inner ends of the aperture plates 347 and 348 which are adjacent the bearing housing 356 outwardly along the length of the aperture slits in the aperture plates 347 and 348.

As described hereinabove, the optical arrangement is such that lines "A1" and "B2" of the data appearing on the cards C-4, that is the first and second printed lines, are reflected by the mirrors 344 and 345 to the scanning slots 350 adjacent the open end of the scanning head 325, while the lines of data "C3" and "D4," that is the third and fourth lines of data on the cards C-4, are directed by the mirrors 344 and 345 to the scanning slots 351 that are in the row adjacent the opposite or closed end of the scanning head 325. Thus, and as previously described, the scanning slots 350 and 351 during their traverse of the aperture slits in the aperture plates 347 and 348 pick up or view increments of the inverted characters of the data appearing on the cards C-4.

Arranged within the scanning head 325 behind the scanning slots are four mirrors 360, Fig. 20, which are so positioned as to be illuminated by the reflected beams emitted by the lamps 338 and 339, and it will be appreciated of course that the mirrors 360 are illuminated to the extent that the scanning slots 350 and 351 enable light to pass through the scanning head 325. The mirrors 360 are adapted to direct the beams of light passing through the scanning slots in the scanning head 325 to a set of four photo cells 361, Fig. 18, arranged in a housing 362 at the back of the machine. As before, so long as portions of the cards C-4 bearing no data are illuminated by the lamps 338 and 339, the photo cells 361 receive a constant or unvarying light signal, but as portions of the cards bearing data pass beneath the objective lenses 335 and 336 inversions of these characters in effect traverse the aperture slits in the aperture plates 347 and 348 from top to bottom, that is, at right angles to the traversing action of the scanning slots 350 and 351 in this regard. As a consequence, the beams of light received by the mirrors 360 are interrupted by each incremental "black" portion of the inverted characters that are detected by the scanning slots 350 and 351 traversing the aperture slits as aforesaid, and the photo cells 361 receive corresponding "black" signals from the mirrors 360.

The inverted nature of the characters scanned is illustrated in Fig. 20, but inasmuch as the signals received by the photo cells, as signal translations of the inverted characters, have no space or form significance as such, but only time significance, depending upon the duration of a "black" signal, the characters printed at the printing station are developed in space, that is in printed form, in accordance with the time significance of the signals. Thus, the shaft 355 which drives the scanning head is extended forwardly, and arranged along this forwardly extending portion of the shaft 355 are, in the present instance, three printing stations PS-1, PS-2 and PS-3 each comprising a series of individual printing disks as 364 bearing axially pitched circumferentially discontinuous printing edges or anvils E of the kind described hereinbefore. The printing edges E rotate synchronously with the scanning head 325 and are in phase with the scanning slots 350 and 351; that is, the printing edges E are disposed about the shaft 355 at 90° intervals as are the scanning slots 350 and 351 so that the leading and trailing ends of the printing edges E and of the scanning slots are in phase.

Cooperating with the printing edges E are electromagnetic vibrators as 365 having blades 366, and the blades 366 are dimensioned so as to span the displacement between the trailing end t-1, Figs. 28 and 29, of one printing edge E on a printing disk and the leading end e-1 of the next printing edge on the same disk.

Inasmuch as four lines of data are to be reproduced there are four such printing vibrators 365-1, 365-2, 365-3 and 365-4 associated with four printing disks at each of the printing stations, and the sheet MS-2, Fig. 19, that is to be printed is first directed upwardly between the printing disks on shaft 355 and the vibrators 365-2 and 365-4 on one side of shaft 355 that are to print the second and fourth lines of data, and then the sheet MS-2 is reversed and directed downwardly between the printing disks and the vibrators 365-1 and 365-3 on the opposite side of shaft 355 that are to print the first and third lines of data.

As is set forth in more detail below, three carbon tapes are interposed between the printing vibrators and the sheet to be printed at each of the printing stations PS-1, PS-2 and PS-3. Thus, as the printing vibrators 365 are excited by "black" signals emitted from the scanning station, the blades 366 of the three excited vibrators, one at each printing station, drive the carbon tapes and the sheet to be printed against the particular printing edge E that happens to be in phase with the scanning slot that originated the "black" signal. In this manner the lines of data are developed on the sheet to be printed, bearing in mind that the sheet to be printed advances continuously through the printing stations, usually at a speed corresponding to the speed of the cards C-4 through the scanning station.

In the present embodiment of the invention, multiple records of the data scanned are printed. In Fig. 26, a fragment PS of the sheet MS-2 to be printed is illustrated, and it will be observed that the sheet MS-2 across the width thereof includes three forms F-1, F-2, and F-3 that are separated one from the other by weakenings 370 of the usual kind enabling the forms to be separated upon completion of the printing run. Along either side edge, the sheet MS-2 includes strips as 371 attached to the sheet along weakenings 372, and these strips 371 are regularly perforated at 373 to enable the sheet to be fed through the machine.

The several forms F-1, F-2 and F-3 are printed with the data 326, 327, 328 and 329 from the cards C-4 as the cards are scanned. Thus, the several forms across the width of the sheet MS-2 are each imprinted with a reproduction 326A, Fig. 23, of the address on a particular card C-4, Fig. 25, and reproductions 327A, 328A, 329A of the other aforementioned data appearing on the same card C-4. At the completion of the printing run, the several forms on the sheet MS-2 bearing the reproduced data are separated, one such form to be mailed to the policy holder and the remaining forms to be used as records of the billing.

The sheet MS-2, Fig. 17, is arranged as a fan-fold in a magazine M at the front of the machine afforded in the base 372 of the machine. Resting on the base 372 is a relatively large cabinet 373 including a base plate 374 that serves to support certain of the parts described hereinafter. Thus, a bracket 375 is secured to a mounting base 376 that is supported by the base plate 374, and this bracket rotatably supports one end of an idler sprocket 380 having pins registering with the openings 373 along the side edges of the sheet MS-2, suitable web tensioning means 381 being provided to hold the sheet MS-2 to the idler drum 380. From the drum 380, the sheet MS-2 is directed upwardly toward a guide comprising a relatively long pin 382, Figs. 17 and 22, which is reduced in diameter at spaced portions 383. The guide pin 382 is supported at one end in the arm 385 of a bracket 386, Fig. 22, secured to one face of a relatively large mounting block 390, and this same mounting block serves as a mounting base for the bearing housing 356. At the opposite end, the guide pin 382 is supported at the lower end of a bracket 391 which is secured to a hood member 392 cast integrally with the bearing housing 356. The hood 392, Fig. 23, includes a front wall 393, a top wall 394 and a rear wall 395, enclosing a relatively large cavity partially closed on one side by a side wall 396, Fig. 17. The side wall 396 includes relatively large openings 396A in which certain of the printing vibrators are mounted.

Secured to the rear wall 395 of the hood 392 is a bracket 392B. The front wall of the hood 392 is formed with a bearing plate 392P and secured to the inner face thereof, Fig. 23, is a bracket 392C. Supported at either end in the brackets 392B and 392C is another relatively long guide pin 397, Fig. 23. The guide 397 is centered above and with respect to the shaft 355, and the sheet MS-2 is directed from the guide pin 382 upwardly to and about the guide pin 397 serving to reverse the sheet MS-2. Arranged in parallel spaced relation to the guide 382 is another guide 400 which is supported at one end in the arm 385 of the bracket 386 and at the opposite end in an arm 401 of thet bracket 391. Portions 403 of the guide 400 opposite the reduced portions 383 of the guide 382 are likewise reduced in diameter, and the sheet MS-2 is directed from the guide 397 downwardly about the guide 400 and then to a feed roller 405.

The feed roller 405 is rotatably supported at one end in a bracket 406 extending forwardly from the mounting base 376 as shown in Fig. 17. The sheet MS-2 is directed about the lower peripheral portion of the feed roller 405, and a plurality of yieldably mounted friction disks 407, Fig. 22, serve to tension the sheet MS-2 on the feed roller 405.

Beyond the feed roller 405, the sheet MS-2, Fig. 17, is tensioned by a pair of rollers 415, and the sheet MS-2 is then directed upwardly about a feed sprocket 420 which is frictionally driven so as to advance the sheet MS-2 along the path thus described at the desired speed, the sheet MS-2 then being fed into a receiving magazine afforded at the end of the cabinet 372 opposite the supply magazine M.

Inasmuch as there are three printing stations, Fig. 19, in the present instance it is advantageous to utilize three separate carbon tapes or strips CS-2, Fig. 17, allocated respectively to the three printing stations. The carbon tapes CS-2 may be supplied individually from three reels 425 which are rotatably mounted on a common shaft separated by upright standards 426 such that the supply reels 425 are disposed over the idler sprocket 380 associated with the feed for the sheet MS-2. The reels 425 are in spaced relation one with respect to the other, and individual carbon tapes are directed from the supply reels 425 to a set of correspondingly spaced guide rollers 429, Fig. 17. The carbon tapes are then directed to the left as viewed in Fig. 17 in parallel spaced relation to the guide 382 mentioned above. The spacing between the carbon tapes is such that the tapes are adapted to travel on the reduced portions 383 of the guide 382 thereby assuring that the sheet MS-2 engaging the guide 382 is spaced from the face of the carbon tapes bearing the usual carbon coating.

From the guide 382, the carbon tapes are then directed upwardly as shown in Fig. 22 to a set of three idler rollers 431, 432, and 433 centered over the guide 397 for the sheet MS-2, and it is here that the direction of the carbon tapes is reversed from an upward pass to a downward pass with respect to the shaft 355, as shown particularly in Figs. 22 and 23. Thus, the idlers 431, 432 and 433 are arranged in spaced relation and for rotation on a relatively long mounting shaft 435 which is supported at one end in the rear wall 395 of the hood 392 and at the opposite end in a bushing sleeve 435 that is mounted on the front bearing plate 392P of the hood 392. The tapes CS-2 are directed downwardly from the idlers on shaft 435 to the reduced portions 403 of guide 400 then horizontally to a set of three guide rollers 436, Fig. 17, and then are threaded between a set of engaged tension rollers 437. From the tension rollers 437, the carbon tapes are then wound on three take-up reels as 438 which pull the carbon tapes through the machine at the speed of the sheet MS-2.

It will be observed in Fig. 22 that a pair of spaced parallel guides 440 and 441 are interposed between the shaft and the two guides 382 and 400. The guides 440 and 441 are supported between the rear wall of the hood 392 and the bearing plate 392P at the front wall thereof, and at locations corresponding to the spacing between the carbon tapes the guides 441 and 442 are flattened at 443, Fig. 22, on the outer sides. The carbon tapes travel on the flat faces 443 as shown in Fig. 21, while the sheet MS-2 is guided on the inner faces of the guides 441 and 442 so that the sheet MS-2 at the printing stations is normally spaced from the carbon tapes.

The three printing stations PS-1, PS-2 and PS-3, Fig. 23, are arranged tandemly in axial spaced relation along the shaft 355 in conformance with the tandem arrangement of the forms F-1, F-2 and F-3 across the width of the sheet to be printed. The shaft 355 extends forwardly through the hood 392 from the rear wall 395 thereof to the front wall 393, and the end of shaft 355 which is outboard with respect to the bearing housing 356 is supported by a roller bearing 445 mounted in the bearing plate 392P afforded at the front of the hood 392. The shaft 355 is on the vertical center line which is common to shaft 397 about which the sheet MS-2 is reversed and the shaft 435 on which the guide rollers for the carbon tapes are journaled. In the present instance, the printing stations PS-1, PS-2 and PS-3 each comprise sets of individual printing disks as 364, Figs. 27, 28 and 29 which are of the kind described in detail hereinabove.

Adjacent the end which carries the scanning head 325, Fig. 23, the shaft 355 is supported in a roller bearing R-1 provided in the bearing housing 356, and inwardly of the portion supported in the roller bearing R-1 the shaft 355 is provided with a pulley 455 adapted to be driven by a belt 456 which in turn is driven from a motor 457, Fig. 18. Forwardly of the pulley 455, shaft 355 is further supported in ball bearings R-2 and R-3, and these bearings in part are retained in place in the bearing housing 356 by a washer and lock nut assembly 460 mounted on a threaded portion 460A, Fig. 24, on the shaft 355. Forwardly of the threaded portion 460A, the shaft 355 is tapered forwardly at 463, Fig. 24, for a substantial length and then is further reduced to a uniform diameter at 464 which is coextensive in length from the printing station PS-1 to and beyond the printing station PS-3 to a threaded portion 465. The extreme outboard end of the shaft 355 is yet further reduced at 467, and it is this reduced portion of shaft 355 that is supported by the roller bearing 445 at the front wall of the hood 392.

The several printing stations disposed tandemly along the shaft 355 are separated by changeable spacers, and this is conveniently attained by first telescoping a relatively long mounting sleeve 470, Figs. 24 and 28, on to shaft 355. The inboard end of the mounting sleeve 470 is provided with a tapered bore 471 which is complemental to the tapered portion 463 of shaft 455 and at the opposite end sleeve 470 is threaded at 472, this threaded portion 472 terminating adjacent the threaded end portion 465 of the shaft 355. Once the disks that are included in the several printing stations have been assembled on the sleeve 470, a lock nut 173 is screwed onto the threaded portion of shaft 355 to engage the outboard end of the mounting sleeve 470, and the nut 473 is tightened to clamp the mounting sleeve 470 tightly to shaft 355 so that rotation of the mounting sleeve 470 and the printing disks 364 thereon are synchronized with the scanning head 25.

The mounting sleeve 470 is formed with a spacer section 474 of predetermined length which terminates at a shoulder 475 of reduced dimension against which the inboard side of the first printing disk 364 assembled on sleeve 470 is engaged. Each printing disk 364 is bored through so as to be capable of assemblage by a press fit on a reduced section 477 of the mounting sleeve that extends from the shoulder 475 forwardly to the threaded portion 472 at the outboard end thereof which is beyond the last printing disk of the printing station PS-3. The printing disks 364 each include a pair of V-shaped nose elements 481 projecting from what constitutes the inboard side thereof, and at the opposite or outboard side each printing disk 364 is formed with a pair of complemental V-shaped notches 482. As the printing disks are pressed on to section 477 of the mounting sleeve 470, the nose elements of the outboard disks at each printing station are seated in the complemental notches of the inboard disks. In this way, assurance is had that the printing disks at each printing station will rotate synchronously together. It is not necessary that the first printing disk assembled on the sleeve 470 include nose elements 481, see Fig. 28, but where such are included then the shoulder 475 on the mounting sleeve against which this first printing disk at the first printing station disposed should include notches complemental to the nose elements of the first such disk.

Inasmuch as there are four lines of data to be printed at the printing stations PS-1 through PS-3 in the present instance, there are four disks 364-1, 364-2, 364-3 and 364-4, each allocated to a respective line of data to be printed. To space the printing stations so that the data printed thereby will be reproduced at the desired location on the forms F-1, F-2 and F-3 (Fig. 26) spacer sleeves as 485 and 486 of predetermined length are pressed on to the section 477 of the mounting sleeve 470 so as to be interposed between the last printing disk 364-4 of an inboard printing station as PS-1 or PS-2 and the first printing disk 364-1 of the next outboard printing station as PS-2 or PS-3.

The inboard end of each spacer 485 and 486 is formed with a shoulder 488 (Fig. 28) of reduced diameter, and this shoulder includes a pair of nose elements 488N that engage the complemental notches 482 of the printing disk 364-4 which is allocated to the last or fourth line of data to be printed. Likewise, the outboard ends of the spacers 485 and 486 are reduced to afford shoulders 489 having notches 489N to receive the nose elements of the printing disks 364-1 allocated to the first line of data to be printed.

As shown contrastingly in Figs. 28 and 29, the spacer sleeves thus used to locate the printing stations along the shaft 355 may be of variable length to enable selections to be made. Thus, it will be noted that a spacer 495 (Fig. 29) may be interposed between the shoulder 475 of the mounting sleeve 470 and the first printing disk 364-1 of the printing station PS-1. Such of course displaces the first printing station PS-1 further outboard along the shaft 355 as compared to the arrangement in Fig. 28, and a spacer 485A of shorter dimension as compared to the spacer 485 is interposed between the first and second printing stations so that the second printing station in each instance occupies the same relative position.

It will be appreciated that while three printing stations have been described herein, there may be more or less, depending of course upon the number of forms that extend across the width of the sheet to be printed. After the printing disks in the last printing station PS-3 have been assembled on the mounting sleeve as above described, a spacer collar 497 is pressed on to the exposed end of section 477 of the mounting sleeve 470. The length of the spacer 497 depends upon the location of the printing station PS-3 along shaft 355, and the spacer 497 includes a shoulder 498 having nose elements 498N, Figs. 28 and 29, that seat in the notches 482 of the last printing disk at station PS-3. A lock nut 499 is then screwed on to the threaded portion 472 of sleeve 470 that extends beyond the spacer 497, and this nut is tightened to lock the printing disks and spacers on sleeve 470 firmly together for synchronized rotation.

The printing vibrators are of a known kind being described in U.S. Patent No. 2,646,518 and are arranged in pairs on either side of the shaft 355 so that the blades 366 thereof, Figs. 20 and 21, are opposite the printing edges E on the corresponding printing disks 364 allocated to the respective lines of data to be printed at each printing station. Thus, as was mentioned above, the vibrators 365-1 and 365-3 which are used to print the first and third lines of data at each printing station are disposed on the side of shaft 355 which corresponds to the downward pass of the sheet MS-2, this being the left side as viewed in Fig. 21. The vibrators 365-1 and 365-3 at the respective printing stations PS-1, PS-2 and PS-2 are carried in housings afforded by respective pairs of plates 510, Fig. 21, and these plates at the lower ends include extensions 511, that are pivotally mounted on a pin 515, suitable spacers being provided between the vibrator housings so as to position the blades of the vibrators 365-1 and 365-3 directly opposite the printing edges E of the printing disks 364-1 and 364-3 which are the ones corresponding to the first and third lines of data to be printed. The mounting pin 515 which pivotally supports the plates 510 for housing the vibrators 365-1 and 365-3 is extended between the lower ends of the front and rear walls 519 and 520 of a hood member 521 which is companion to the hood member 392 described above.

The hood 521 is hinged at the inner end on a vertical hinge pin 521P, Fig. 18, carried in an arm 521A at the rear of the hood 392 so as to be capable of being opened with respect to the companion hood 392, this being the condition shown in Fig. 21. Thus, the hood 521 is adapted to be pivoted to the right as viewed in Fig. 21 to close on hood 392, as shown in Fig. 17, and it will be observed that the front wall of the hood 521 is recessed at 524 so as to embrace the edges of the bearing plate 392P that is afforded at the front wall 393 of the hood 392. A latch arm 526 is pivoted on a pin 527 carried by the bearing plate 392P and this latch includes a notch 528 which is adapted to wedgingly engage a latch pin 529 on the front wall of the hood 521 as shown in Fig. 17, to clamp the hoods 392 and 521 together.

The pairs of printing vibrators 365–2 and 365–4, Fig. 20 which cooperate with the printing disks 364–2 and 364–4 allocated to the second and fourth lines of data to be printed, are arranged within the hood 392 in a way similar to that described above for the vibrators that are mounted within the hood 521. As mentioned, the vibrators 365–2 and 365–4 at each of the three printing stations are disposed on the right hand side of shaft 355 as viewed in Fig. 22, which is to say that these vibrators are adapted to print the second and fourth lines of data during the upward or initial pass of the sheet MS–2 through the printing station. Inasmuch as the vibrators thus allocated to the second and fourth lines of data are identical to the vibrators 365–1 and 365–3, Fig. 21, these details need not be redescribed, and it need merely be pointed out that the vibrators in the hood 392 are housed between plates 510A, Fig. 23 that are disposed within the respective recesses 396A provided in the side wall 396 of the hood 392 so that the blades of these vibrators are directly opposite the edges E of the printing disks 364–2 and 364–4 of the respective printing stations. The lower ends of the plates 510A are pivoted on a mounting pin 515A which extends between the front and rear walls of the hood 392 at the bottom thereof, spacers as 530 being provided on pin 515A between the vibrator housings to accurately position the blades of the vibrators as aforesaid.

The upper ends of the plates 510 and 510A, in which the vibrators are housed are formed with inwardly projecting ears 535, Fig. 21, and the housings for the vibrators 365–1 and 365–3 include latch arms between the ears 535. Latch pins (not shown) are provided at the upper ends of the plates 510A which house the vibrators 365–2 and 365–4, and these pins are adapted to be engaged by cam edges 536C that are formed on the latch arms 536. After the hood 521 has been closed on the hood 392, the housings for the vibrators are pivoted inwardly on the mounting pins 515 and 515A toward shaft 355 until the ears 535 bear against portions of shaft 435 intermediate the idlers 431, 432 and 433. The latch arms 536 are then depressed so that the cam edges 536C thereof engage the aforementioned latch pins, thereby assuring that the ears 535 in the vibrator housings are held against shaft 435 to accurately locate the blades 366 of the vibrators opposite edges E of the printing disks. The distance that the blades 366 are spaced from the printing edges E is minor of course, and the sheet MS–2 and the tapes CS–2 are threaded through the space between the blades 366 and the edges E.

It will be appreciated that the several printing stations as PS–1, PS–2 and PS–3 are displaced axially along shaft 355 in conformance with the spacing between the forms as F–1, F–2 and F–3, Fig. 26, that are to receive impressions, and as noted above this displacement may be varied to enable forms of different kinds to be handled by the printing machine. In those instances where the positions of the printing stations are altered, the housings for the vibrators carried on the pins 515 and 515A will likewise be shifted as enabled by spacers 530. As an incident to this, the position of the several carbon tapes CS–2 is likewise changed, entailing selective repositioning of the idlers 431, 432 and 433 with respect to the selective repositioning of the printing stations as will be readily apparent from Fig. 23.

During the course of operation of the machine described in connection with Figs. 17–29, discrete signals are generated at the scanning station as the printed characters on the tabulating cards are incrementally translated. For each "black" signal the blades of the three corresponding vibrators are excited to drive the carbon tape CS–2 and the sheet MS–2 against the corresponding printing anvils represented by the pitched edge elements E of the printing disks at the three printing stations which are in phase with this "black" signal. The sheet MS–2 and the carbon tape are held against the printing edges E for the duration of the "black" signal. Of course, the sheet MS–2 and the carbon tapes are advancing together through the printing stations, and the shaft 355 is rapidly rotating. The shaft 355 is driven at an exceedingly high speed as will be readily apparent from the fact that each reflected character of the tabulating cards traversing an aperture slit in plate 344 or 345, Fig. 19, is ordinarily scanned by approximately five to eight of the scanning slots 350 or 351 in the particular row that happens to be operative with respect to such a character, and the three vibrator blades for this character are excited for as many increments of portions of this character that are thus scanned.

In this connection it should be pointed out that the number of scanning slots 350 or 351 in a circumferential row about the scanning head may be of variable number. Thus, it will be observed in Fig. 24 that the scanning head 325, Figs. 19 and 23, having four slots in a row has been replaced by a scanning head 325A which includes eight scanning slots 350A and 351A in a circumferential row, and these slots are displaced at 45° intervals. Where an eight-slot scanning head as 325A is thus resorted to, the printing disks at the printing station should likewise include eight circumferential discontinuous and pitched printing edge elements E–1 as shown in Fig. 27, and the edges E–1 will of course be in phase at 45° intervals with the scanning slots 350A and 351A.

From the foregoing it will be seen that in accordance with one aspect of the present invention, a plurality of spaced apart printing stations are afforded, each under control of the same signals emitted from the scanning station, so that multiple impressions of the data scanned may be obtained. The spacing of the printing stations may be varied to conform to the spacing of the several forms to be printed that are passed through the machine, and in effect each form receives an original impression.

Thus, while I have illustrated and described the preferred embodiments of my invention, it is to be understood that these are capable of variation and modification.

I claim:

1. In a facsimile printing machine of the kind described wherein individual business instruments such as tabulating cards or the like bearing data to be reproduced are exposed one by one to a scanner having scanning slots for collecting data to be reproduced on a sheet or the like by a signally controlled vibrator cooperating with a printing anvil, and including means to translate signally the data scanned for transmission to the vibrator and means to rotate the scanner, a printing station comprising a shaft adapted to be driven synchronously with the scanner, a plurality of disks individually assembled about said shaft and each being allocated to a vibrator to reproduce a given fractional portion of the data on said sheet at the printing station, means to lock said disks one to the other and for synchronized rotation with said shaft, and a plurality of printing anvils in the form of edge elements projecting from said disks and arranged in axial pitched relation thereon, said disks being individually adjustable axially with respect to said shaft to enable blank spacer disks to be assembled on said shaft between adjacent ones of the disks having such edge elements thereon.

2. In a facsimile printing machine of the kind described wherein individual business instruments such as tabulating cards or the like bearing data to be reproduced are exposed one by one to a scanner having scanning slots for collecting data to be reproduced on a sheet or the like by a signally controlled vibrator cooperating with a printing anvil, and including means to translate signally the data scanned for transmission to the vibrator and means to rotate the scanner, a printing station comprising a shaft adapted to be driven synchronously with the scanner, a plurality of disks individually assembled about said shaft and each being allocated to a given fractional portion of the data to be reproduced by such a vibrator on said sheet at the printing station, means to lock said disks one to the other and for synchronized rotation with said shaft, and a printing anvil projecting from each such disk in the form of a circumferentially discontinuous edge element having a predetermined pitch so that disks having such edges of different pitch may be selectively substituted on said shaft.

3. In a facsimile printing machine of the kind described wherein individual business instruments such as tabulating cards or the like bearing data to be reproduced are exposed one by one to a scanner having scanning slots for collecting data to be reproduced on a sheet or the like by a signally controlled vibrator cooperating with a printing anvil, and including means to translate signally the data scanned for transmission to the vibrator and means to rotate the scanner, a printing station comprising a shaft adapted to be driven synchronously with the scanner, a plurality of separate disks assembled on said shaft for synchronized rotation therewith and each being allocated to a line of data to be reproduced by such a vibrator on said sheet at the printing station, and a plurality of printing anvils in the form of circumferentially discontinuous axially pitched edge elements arranged in projecting relation on said disks, said disks being removably mounted on said shaft to enable disks having such edges of different pitch to be selectively substituted and being individually adjustable axially on said shaft to enable blank spacer disks to be assembled on said shaft between adjacent ones of the disks having said edge elements thereon whereby the spacing between the lines of reproduced data may be correspondingly varied.

4. In a facsimile printing machine of the kind described, means at a printing station adapted to be driven synchronously with a scanner, a plurality of disks individually assembled on said means and allocated to a printing vibrator at the printing station, and a plurality of printing anvils in the form of circumferentially discontinuous edge elements arranged in predetermined axial pitched relation on each such disk so that disks having such edge elements of different pitch may be selectively substituted, said disks being individually adjustable axially on said shaft to enable spacer disks to be assembled on said shaft between adjacent ones of the disks having said edge elements thereon.

5. In a facsimile printing machine of the kind described, means at a printing station adapted to be driven synchronously with a rotating scanner, a plurality of disks individually assembled on said means and each being allocated to a line of data to be reproduced on a sheet at the printing station, means on the disks to lock said disks one to the other for synchronized rotation with said means, and a printing anvil on each such disk in the form of a plurality of circumferentially discontinuous printing edge elements.

6. In a facsimile printing machine of the kind described including a rotatable scanner for collecting data to be reproduced on a sheet or the like at a printing station by a signally controlled vibrator cooperating with a printing anvil and means to rotate the scanner, a printing station comprising a shaft adapted to be driven synchronously with the scanner, a plurality of individual disks assembled on said shaft for synchronized rotation therewith and each being allocated to a line of data to be reproduced on said sheet at the printing station, and printing anvils in the form of circumferentially spaced printing edge elements arranged in axial pitched relation on each such disk so that as the trailing end of one such element passes a base line during rotation of said shaft the leading end of the next such element on the same disk is at the threshold of said base line, said disks being removably mounted on said shaft to enable disks having printing edge elements of different pitch to be used and being individually adjustable axially with respect to said shaft to enable spacer disks to be assembled on said shaft between adjacent ones of the disks having such edge elements thereon whereby the spacing between the lines of reproduced data may be correspondingly varied.

7. Printing means of the kind described comprising a disk adapted to be assembled about a rotatable shaft at the printing station of a printing machine, and a printing anvil on said disk in the form of a plurality of edge elements projecting therefrom, said edge elements being circumferentially discontinuous and developed in axial pitched relation on said disk so that as the trailing end of one such element rotates past a base line the leading end of the next such element is at the threshold of the base line.

8. Printing means of the kind described comprising a disk adapted to be assembled about a rotatable shaft at the printing station of a printing machine, a printing anvil on said disk in the form of a plurality of edge elements projecting therefrom, said edge elements being circumferentially discontinuous and developed in axial pitched relation on said disk so that as the trailing end of one such element rotates past a base line the leading end of the next such element is at the threshold of the base line, and nose elements projecting from one side of said disk and notches at the other side of said disk complemental to the nose elements to enable a set of said disks to be assembled on said shaft in side by side relation with the nose elements of one disk seated in the notches of the next disk.

9. A printing machine of the kind described adapted to produce identical multiple records of characters printed in lines on individual business instruments such as tabulating cards or the like and comprising, a rotatable scanner at a scanning station operative to scan optically each line of printed characters carried by such business instruments, means cooperating with the scanner at the scanning station to translate the characters scanned into discrete signals, means to advance such instruments in sequence through the scanning station, a driven shaft for rotating the scanner, a plurality of printing stations each including a plurality of circumferentially discontinuous printing anvils in the form of edge elements pitched axially on a plurality of disks carried by said shaft so as to rotate synchronously with said scanner, the disks at each printing station being allocated respectively to a line of the characters to be reproduced and being adapted for axial displacement one relative to the other along said shaft to correspondingly vary the spacing between the lines of reproduced data at each printing station, changeable spacer sleeves separating axially the printing stations along said shaft to enable the displacement of the printing stations to be varied, means to feed said sheet past the printing stations, and vibrators signally controlled by the signals emitted at the scanning stations to cooperate with said edge elements at each printing station to produce simultaneously on said sheet identical multiple records of the data scanned.

10. In a printing machine of the kind described adapted to produce on a sheet or the like identical multiple records of data carried on individual business instruments such as tabulating cards or the like, means to translate into signals data on said instruments, and a plurality of printing stations in the machine to which said signals are transmitted for simultaneous multiple reproduction at different areas on said sheet, said printing stations each including at least one rotatable printing edge and cooperating vibrator operated signally in accordance with said signals.

11. In a printing machine of the kind described adapted to produce on different forms identical multiple records of data carried on individual business instruments such as tabulating cards or the like, means to translate into signals certain of the data on said instruments, and a plurality of printing stations in the machine to which said signals are transmitted for simultaneous reproduction on the different forms, said printing stations each including a plurality of individual printing disks having discontinuous printing edges thereon and vibrators opposite said printing edges under control of said signals.

12. In a printing machine of the kind described adapted to print different forms with identical multiple records of data carried on individual business instruments, means to translate into signals certain of the data on the instruments, and a plurality of printing stations in the machine to which said signals are transmitted for simultaneous reproduction on the different forms, each such printing station being displaced from the other by an interposed spacer and including a plurality of printing disks having developed thereon a plurality of circumferentially discontinuous printing edges and vibrators opposite said printing edges under control of said signals.

References Cited in the file of this patent

UNITED STATES PATENTS

| | | |
|---|---|---|
| 2,160,951 | Alice | June 6, 1939 |
| 2,510,200 | Thompson | June 6, 1950 |
| 2,560,247 | Rich | July 10, 1951 |
| 2,571,720 | Hunt | Oct. 16, 1951 |
| 2,666,807 | Hunt | Jan. 19, 1954 |
| 2,695,924 | Ballard | Nov. 30, 1954 |
| 2,717,191 | Hester | Sept. 6, 1955 |

FOREIGN PATENTS

| | | |
|---|---|---|
| 762,077 | Great Britain | Nov. 21, 1956 |